US008287357B2

(12) United States Patent
Evans

(10) Patent No.: US 8,287,357 B2
(45) Date of Patent: Oct. 16, 2012

(54) GAMING SYSTEM, GAMING DEVICE, AND METHOD FOR PROVIDING A CASCADING STYLE MATCHING GAME

(75) Inventor: Kyle H. Evans, Washoe Valley, NV (US)

(73) Assignee: IGT, Reno, NV (US)

( * ) Notice: Subject to any disclaimer, the term of this patent is extended or adjusted under 35 U.S.C. 154(b) by 347 days.

(21) Appl. No.: 12/576,023

(22) Filed: Oct. 8, 2009

(65) Prior Publication Data

US 2011/0086695 A1 Apr. 14, 2011

(51) Int. Cl.
*A63F 9/24* (2006.01)
*A63F 13/00* (2006.01)

(52) U.S. Cl. ............ 463/20; 463/30; 463/43; 273/157 R

(58) Field of Classification Search ........................ None
See application file for complete search history.

(56) References Cited

U.S. PATENT DOCUMENTS 4,722,527 A 2/1988 Gauselmann
5,224,706 A 7/1993 Bridgeman et al.
5,308,062 A 5/1994 Hogan
5,308,065 A 5/1994 Bridgeman et al.
5,332,219 A 7/1994 Marnell, II et al.
5,332,228 A 7/1994 Schultz
5,393,057 A 2/1995 Marnell, II
5,395,111 A 3/1995 Inoue
5,423,539 A 6/1995 Nagao
5,431,408 A 7/1995 Adams
5,449,173 A 9/1995 Thomas et al.
5,531,440 A 7/1996 Dabrowski et al.
5,584,764 A 12/1996 Inoue
5,609,524 A 3/1997 Inoue
5,722,891 A 3/1998 Inoue
5,752,881 A 5/1998 Inoue
5,823,873 A 10/1998 Moody
5,863,249 A 1/1999 Inoue
5,980,384 A 11/1999 Barrie
5,984,782 A 11/1999 Inoue
6,059,658 A 5/2000 Mangano et al.
6,089,977 A 7/2000 Bennett
6,093,102 A 7/2000 Bennett
6,095,921 A 8/2000 Walker et al.

(Continued)

FOREIGN PATENT DOCUMENTS

AU 710015 9/1997

(Continued)

*Primary Examiner* — Melba Bumgarner
*Assistant Examiner* — George Howarah
(74) *Attorney, Agent, or Firm* — Neal, Gerber & Eisenberg LLP

(57) ABSTRACT

A gaming system selects and displays one of a plurality of symbol blocks in each of a plurality of block positions, wherein each of the selected blocks includes at least one partial symbol. Each partial symbol has at least one complementary partial symbol which, when arranged in a designated spatial relationship with one another, form a complete matching symbol. If any of the partial symbols on the selected blocks create a complete matching symbol, the gaming system provides at least one award to the player. Each matching block which includes any portion of a complete matching symbol is then removed, creating an empty block position. The gaming system then fills the empty block position by either shifting a displayed block into the empty block position or by selecting a new block. The gaming system repeats this process until no complete matching symbols are formed.

22 Claims, 20 Drawing Sheets

U.S. PATENT DOCUMENTS

| | | | |
|---|---|---|---|
| 6,120,031 | A | 9/2000 | Adams |
| 6,142,872 | A | 11/2000 | Walker et al. |
| 6,149,521 | A | 11/2000 | Sanduski |
| 6,159,095 | A | 12/2000 | Frohm et al. |
| 6,159,098 | A | 12/2000 | Slomiany et al. |
| 6,190,254 | B1 | 2/2001 | Bennett |
| 6,220,959 | B1 | 4/2001 | Holmes, Jr. et al. |
| 6,241,607 | B1 | 6/2001 | Payne et al. |
| 6,251,013 | B1 | 6/2001 | Bennett |
| 6,261,177 | B1 | 7/2001 | Bennett |
| 6,270,411 | B1 | 8/2001 | Gura et al. |
| 6,290,600 | B1 | 9/2001 | Glasson |
| 6,299,165 | B1 | 10/2001 | Nagano |
| 6,299,170 | B1 | 10/2001 | Yoseloff |
| 6,302,398 | B1 | 10/2001 | Vecchio |
| 6,311,976 | B1 | 11/2001 | Yoseloff et al. |
| 6,312,334 | B1 | 11/2001 | Yoseloff |
| 6,322,078 | B1 | 11/2001 | Adams |
| 6,334,814 | B1 | 1/2002 | Adams |
| 6,336,860 | B1 | 1/2002 | Webb |
| 6,346,043 | B1 | 2/2002 | Colin et al. |
| 6,358,144 | B1 | 3/2002 | Kadlic et al. |
| 6,413,162 | B1 | 7/2002 | Baerlocher et al. |
| 6,416,408 | B2 | 7/2002 | Tracy et al. |
| 6,419,579 | B1 | 7/2002 | Bennett |
| 6,428,412 | B1 | 8/2002 | Anderson et al. |
| 6,439,993 | B1 | 8/2002 | O'Halloran |
| 6,454,266 | B1 | 9/2002 | Breeding et al. |
| 6,494,454 | B2 | 12/2002 | Adams |
| 6,517,433 | B2 | 2/2003 | Loose et al. |
| 6,554,703 | B1 | 4/2003 | Bussick et al. |
| 6,554,704 | B2 | 4/2003 | Nicastro et al. |
| 6,561,904 | B2 | 5/2003 | Locke et al. |
| 6,565,433 | B1 | 5/2003 | Baerlocher et al. |
| 6,604,740 | B1 | 8/2003 | Singer et al. |
| 6,616,142 | B2 | 9/2003 | Adams |
| 6,632,139 | B1 | 10/2003 | Baerlocher |
| 6,634,945 | B2 | 10/2003 | Glavich et al. |
| 6,644,663 | B2 | 11/2003 | Seelig et al. |
| 6,676,511 | B2 | 1/2004 | Payne et al. |
| 6,715,756 | B2 | 4/2004 | Inoue |
| 6,719,630 | B1 | 4/2004 | Seelig et al. |
| 6,746,328 | B2 | 6/2004 | Cannon et al. |
| 6,749,502 | B2 | 6/2004 | Baerlocher |
| 6,780,109 | B2 | 8/2004 | Kaminkow |
| 6,786,818 | B1 | 9/2004 | Rothschild et al. |
| 6,805,349 | B2 | 10/2004 | Baerlocher et al. |
| 6,805,632 | B2 | 10/2004 | Suda |
| 6,808,454 | B2 | 10/2004 | Gerrard et al. |
| 6,866,583 | B2 | 3/2005 | Glavich et al. |
| 6,878,061 | B2 | 4/2005 | Baerlocher et al. |
| 6,905,406 | B2 | 6/2005 | Kaminkow et al. |
| 6,910,962 | B2 | 6/2005 | Marks et al. |
| 6,929,952 | B2 | 8/2005 | Baerlocher |
| 6,935,950 | B2 | 8/2005 | Tarantino |
| 6,939,229 | B2 | 9/2005 | McClintic |
| 6,964,416 | B2 | 11/2005 | McClintic et al. |
| 7,001,274 | B2 | 2/2006 | Baerlocher et al. |
| 7,014,560 | B2 | 3/2006 | Glavich et al. |
| 7,022,016 | B2 | 4/2006 | Wood et al. |
| 7,040,983 | B2 | 5/2006 | Dolloff et al. |
| 7,056,209 | B2 | 6/2006 | Baerlocher et al. |
| 7,059,967 | B2 | 6/2006 | Baerlocher |
| 7,128,646 | B2 | 10/2006 | Baerlocher et al. |
| 7,169,042 | B2 | 1/2007 | Muir et al. |
| 7,222,858 | B2 | 5/2007 | Moody |
| 7,252,591 | B2 | 8/2007 | Van Asdale |
| 7,294,055 | B2 | 11/2007 | Baerlocher et al. |
| 7,309,281 | B2 | 12/2007 | Baerlocher et al. |
| 7,309,282 | B2 | 12/2007 | Baerlocher et al. |
| 7,341,512 | B2 | 3/2008 | Dolloff et al. |
| 7,357,713 | B2 | 4/2008 | Marks et al. |
| 7,371,172 | B2 | 5/2008 | Inoue |
| 7,399,226 | B2 | 7/2008 | Mishra |
| 7,448,948 | B2 | 11/2008 | Hughs-Baird et al. |
| 7,473,173 | B2 | 1/2009 | Peterson et al. |
| 7,494,412 | B2 | 2/2009 | Baerlocher |
| 7,611,406 | B2 | 11/2009 | Fuller |
| 2002/0025849 | A1 | 2/2002 | Olive |
| 2003/0003979 | A1 * | 1/2003 | Seelig et al. .................... 463/16 |
| 2003/0045354 | A1 | 3/2003 | Giobbi |
| 2003/0060267 | A1 | 3/2003 | Glavich et al. |
| 2003/0064768 | A1 | 4/2003 | Fier |
| 2003/0190945 | A1 | 10/2003 | Bussick et al. |
| 2003/0203753 | A1 * | 10/2003 | Muir et al. ...................... 463/20 |
| 2004/0067790 | A1 | 4/2004 | Peterson et al. |
| 2005/0227754 | A1 | 10/2005 | Kaminkow et al. |
| 2006/0046830 | A1 | 3/2006 | Webb |
| 2006/0058097 | A1 | 3/2006 | Berman et al. |
| 2006/0073879 | A1 | 4/2006 | Baerlocher |
| 2006/0084492 | A1 | 4/2006 | Baerlocher et al. |
| 2006/0084498 | A1 | 4/2006 | Baerlocher et al. |
| 2006/0116195 | A1 | 6/2006 | Baerlocher et al. |
| 2006/0217189 | A1 | 9/2006 | Walker et al. |
| 2007/0021176 | A1 | 1/2007 | Jackson |
| 2007/0060246 | A1 | 3/2007 | Baerlocher et al. |
| 2008/0090655 | A1 | 4/2008 | Marks et al. |
| 2008/0096670 | A1 | 4/2008 | Baerlocher et al. |
| 2008/0102931 | A1 * | 5/2008 | Marks et al. .................... 463/20 |
| 2008/0200238 | A1 | 8/2008 | Mishra |
| 2008/0214282 | A1 | 9/2008 | Inoue |
| 2009/0124325 | A1 | 5/2009 | Wadleigh et al. |
| 2009/0124347 | A1 | 5/2009 | Rodgers et al. |
| 2010/0004050 | A1 | 1/2010 | Caputo et al. |
| 2010/0022297 | A1 | 1/2010 | Saunders |
| 2010/0029364 | A1 | 2/2010 | Zielinski |

FOREIGN PATENT DOCUMENTS

| | | | |
|---|---|---|---|
| AU | 722969 | | 6/1998 |
| AU | 200069612 | B2 | 2/2001 |
| AU | 200139027 | B2 | 10/2001 |
| AU | 2001256012 | B2 | 12/2001 |
| AU | 2001256014 | B2 | 12/2001 |
| EP | 0 410 789 | | 1/1991 |
| EP | 0 984 408 | | 3/2000 |
| EP | 1 063 622 | A2 | 5/2000 |
| EP | 1 039 424 | | 9/2000 |
| EP | 1 063 622 | A3 | 12/2000 |
| EP | 1 150 261 | | 10/2001 |
| EP | 1 197 932 | | 4/2002 |
| WO | WO 97/32285 | | 9/1997 |
| WO | WO 00/66235 | | 11/2000 |
| WO | WO 00/76606 | | 12/2000 |
| WO | WO 01/74461 | A1 | 11/2008 |

* cited by examiner

GAMING SYSTEM, GAMING DEVICE, AND METHOD FOR PROVIDING A CASCADING STYLE MATCHING GAME

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur provide higher awards. In such known gaming machines, the amount of the wager made on the base game by the player can vary.

Gaming machines which provide cascading symbol games are also known. In one such cascading symbol game, a gaming machine generates and displays a plurality of symbols in a plurality of symbol positions. The gaming machine evaluates the displayed symbols and provides an award for each winning symbol combination formed. The gaming machine then removes the displayed symbols that form the winning combination(s) of symbols to create one or more empty symbol positions. The gaming machine shifts zero, one, or more of the remaining displayed symbols downward into zero, one, or more of the empty symbol positions. If any empty symbol positions remain, the gaming machine generates and displays a symbol for each empty symbol position. The gaming machine reevaluates the displayed symbols and provides an award for any winning symbol combinations formed. The gaming machine repeats the steps of removing generated symbols, shifting generated symbols, generating new symbols if winning symbol combinations continue to be formed, and evaluating generated symbols.

There is a continuing need to increase this excitement and entertainment for people playing gaming machines. There is also need for new ways of providing better gaming experiences and environments at gaming machines. There is a further need for increasing the number of winning symbol combinations generated and awards provided to a player for a single wager on a play of a game.

SUMMARY

Various embodiments of the present disclosure provide gaming systems, gaming devices, and methods providing a cascading style game which includes a plurality of different symbol blocks. Each of a plurality of the symbol blocks include a plurality of partial symbols. The partial symbols on each block are arranged in a plurality of different orientations. In various embodiments, a partial symbol has one or more complementary partial symbol(s) which, when appropriately arranged in a designated spatial relationship or orientation with one another, form a complete symbol. The symbol blocks and partial symbols on the symbol blocks are configured and arranged such that one, a plurality or each of the partial symbols on each of the plurality of symbol blocks has one or a plurality of complementary partial symbol(s) on one or more of the other symbol blocks. Upon activation of a play of the game, the gaming system randomly selects a plurality of symbol blocks from a set of symbol blocks and displays the selected symbol blocks in a plurality of block positions. The gaming system determines whether any of the plurality of selected and displayed symbol blocks are positioned such that any partial symbols are in a designated spatial relationship or orientation with (e.g., arranged adjacent to) any respective complementary partial symbols to form a complete symbol. In one embodiment, for each complete symbol formed with partial symbols displayed on the symbol blocks, the gaming system provides the player an award for that complete symbol.

In various embodiments, after the gaming system provides the awards for each of the complete symbols, the gaming system removes each symbol block that contained at least one partial symbol which was part of a complete symbol. The removal of each matching block results in an empty block position. After removing the matching blocks, the gaming system fills the empty block positions by: (i) shifting one or more of the already selected and displayed symbol blocks into corresponding empty block positions; (ii) randomly selecting one or more new symbol blocks from the set of symbol blocks and displaying the newly selected symbol blocks in the empty block positions; (iii) shifting one or more of the already selected and displayed symbol blocks into empty block positions creating newly vacated block positions; and (iv) randomly selecting and displaying one or more new symbol blocks in the newly vacated block positions. In various embodiments, the gaming system again determines whether any partial symbols are appropriately arranged in the designated spatial relationship with any complementary partial symbols to create complete symbols and, if so, repeats the above described award distribution, matching block removal, and symbol block shifting or selection until no partial symbols are displayed as spatially related to a complementary partial symbol and no complete symbols are displayed. In one alternative embodiment, the gaming system repeats the above described award distribution, matching block removal, and symbol block shifting or selection a limited number of times.

In one embodiment, the disclosed gaming system displays a plurality of block positions as an M×N format of block positions. In this embodiment, the format of block positions includes a plurality of columns of block positions and a plurality of rows of block positions. In one such embodiment, the gaming system selects a plurality of symbol blocks from a set of pre-determined symbol blocks and displays each of the selected symbol blocks in a block position, wherein the selected and displayed symbol blocks contain at least one of a plurality of partial symbols. In one such embodiment, each of the partial symbols has at least one corresponding complementary partial symbol on another symbol block.

In various embodiments, a partial symbol and any corresponding complementary partial symbol(s) are combined to form a complete symbol if the partial symbols and complementary partial symbols are arranged within a designated spatial relationship of one another. In one embodiment, a complete symbol is formed by a plurality of partial symbols which are adjacent to one another. It should be appreciated that, in certain embodiments the partial symbols can only create a complete symbol if the adjacent partial symbols are properly oriented (i.e., if two partial symbols are adjacent, but one partial symbol is oriented upside down, they do not form a complete symbol). In another embodiment, a complete symbol is formed by a plurality of partial symbols arranged in a particular pattern relative to one another.

In one embodiment, the gaming system provides an award to the player for each complete symbol formed. In one embodiment, when multiple complete symbols are formed, the gaming system provides an award for each complete symbol formed, and one or more additional awards for forming multiple complete symbols in one play of the game. In one such embodiment, the gaming system provides additional awards if the multiple complete symbols formed for one play of the game are arranged in a designated spatial relationship to one another (i.e., situated adjacent to one another).

In various embodiments, the gaming system includes a plurality of different types of symbol blocks, including center symbol blocks and border symbol blocks. In one such embodiment, the center symbol block includes at least one partial symbol oriented on each side of the symbol block. In one embodiment, the gaming system displays a plurality of border symbol blocks which are arranged around the periphery of the format. It should be appreciated that the border symbol blocks are arranged outside of the left side, right side, top and bottom of the format of center symbol blocks, and remain in position throughout plays of the game. In one embodiment, the border symbol blocks are arranged on the left side, right side, bottom and/or top of the format.

Each border symbol block includes a partial symbol, which has a corresponding complementary partial symbol. In one embodiment, the border symbol block contains unique partial symbols, which rarely appear on center symbol blocks. In one embodiment, when a partial symbol on a center symbol block and a partial symbol on a border symbol block are arranged to form a complete symbol, the border symbol block is removed and not replaced. In one such embodiment, when each border symbol block is removed, the gaming system provides an additional award for the player.

In one embodiment, the gaming system forms one or more symbol blocks which each have one or more partial bonus symbols. Similar to the partial symbols of the above embodiments, partial bonus symbols each have at least one complementary partial bonus symbol which, when arranged in a designated spatial relationship to one another, create a complete bonus symbol. In one such embodiment, the gaming system provides a bonus award or causes a bonus event to occur when a complete bonus symbol is formed. In one embodiment, each symbol block containing a portion of the complete bonus symbol is a matching bonus block. In one embodiment, the gaming system includes symbol blocks with wild symbols. Such a wild symbol block combines with each adjacent symbol block to form several complete symbols, regardless of the partial symbols on those adjacent symbol blocks.

The gaming system and method of the present disclosure thus provide a game having increased volatility due to the shifting of selected symbol blocks displaying at least one partial symbol. Each symbol block includes more than one partial symbol, and the gaming system provides more opportunities and combinations to form a complete symbol, thereby providing the player with more opportunities to win awards. Specifically, the gaming system provides a player with an opportunity to win multiple awards for a single play of the game based on the shifting and rearranging of a plurality of partial symbols during a play of the game.

Additional features and advantages are described in, and will be apparent from, the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a “thin client” embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a “thick client” embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
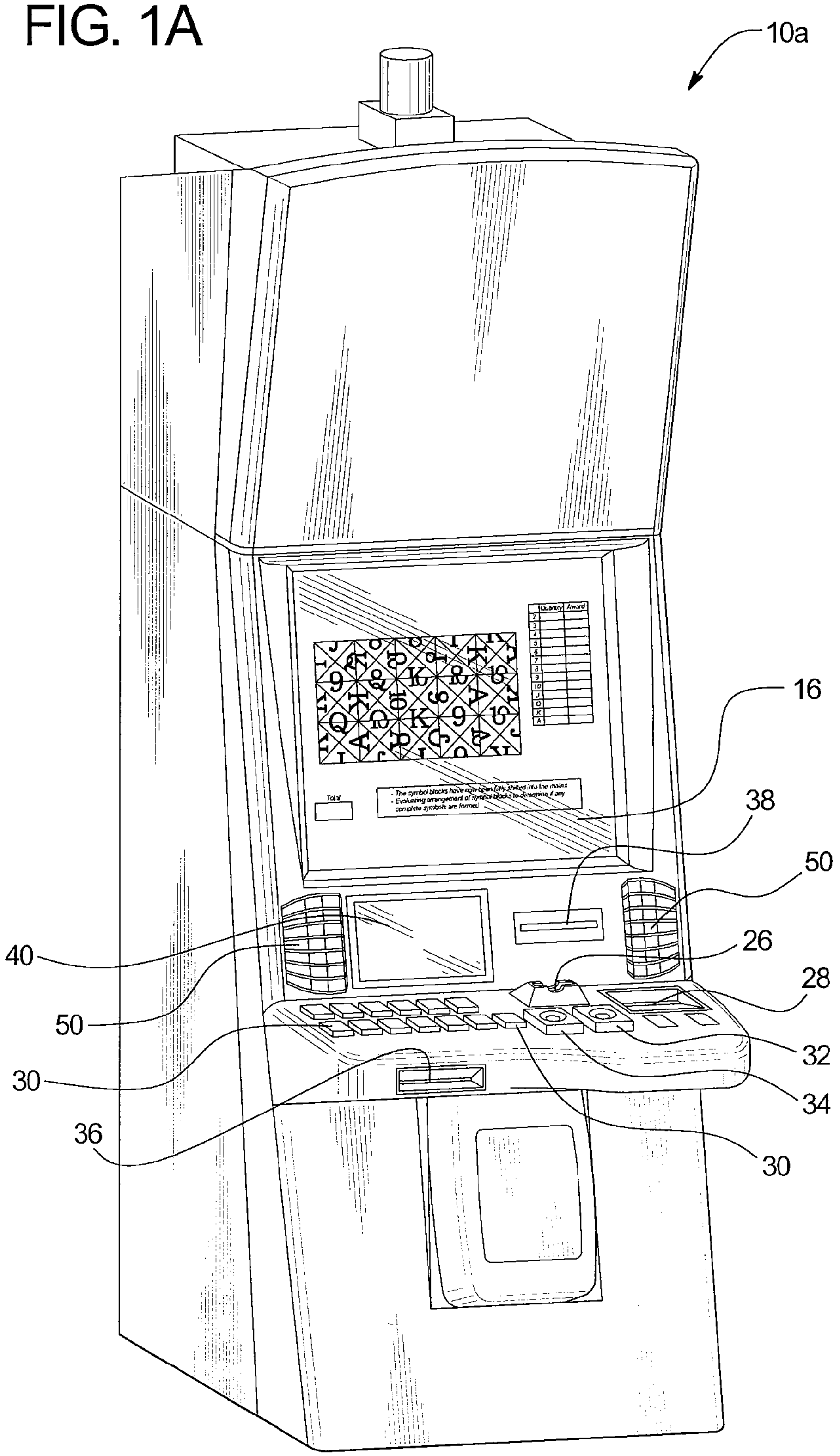
FIGS. 1A and 1B are perspective views of example alternative embodiments of the gaming device of the present disclosure.
Figure 1B:
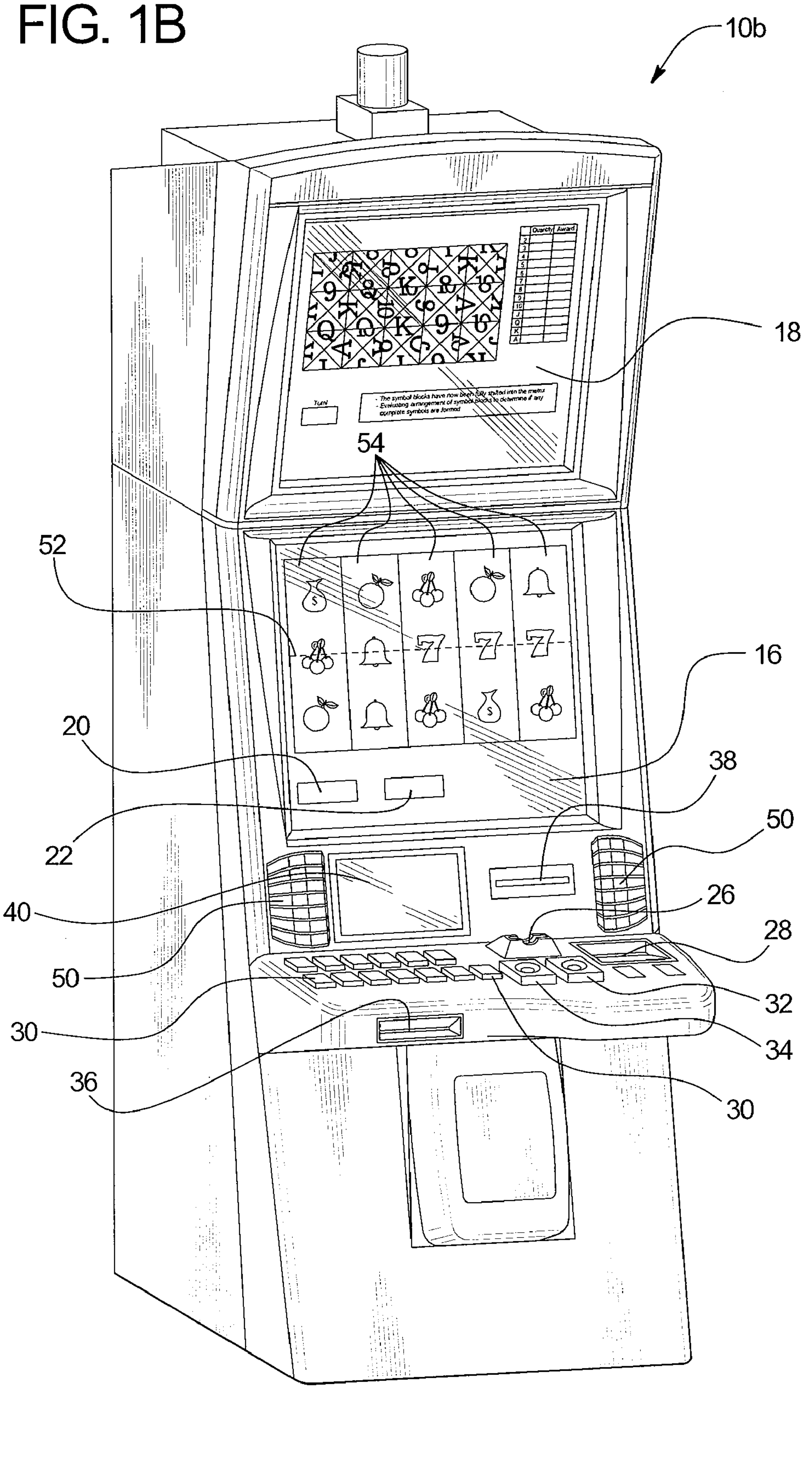

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
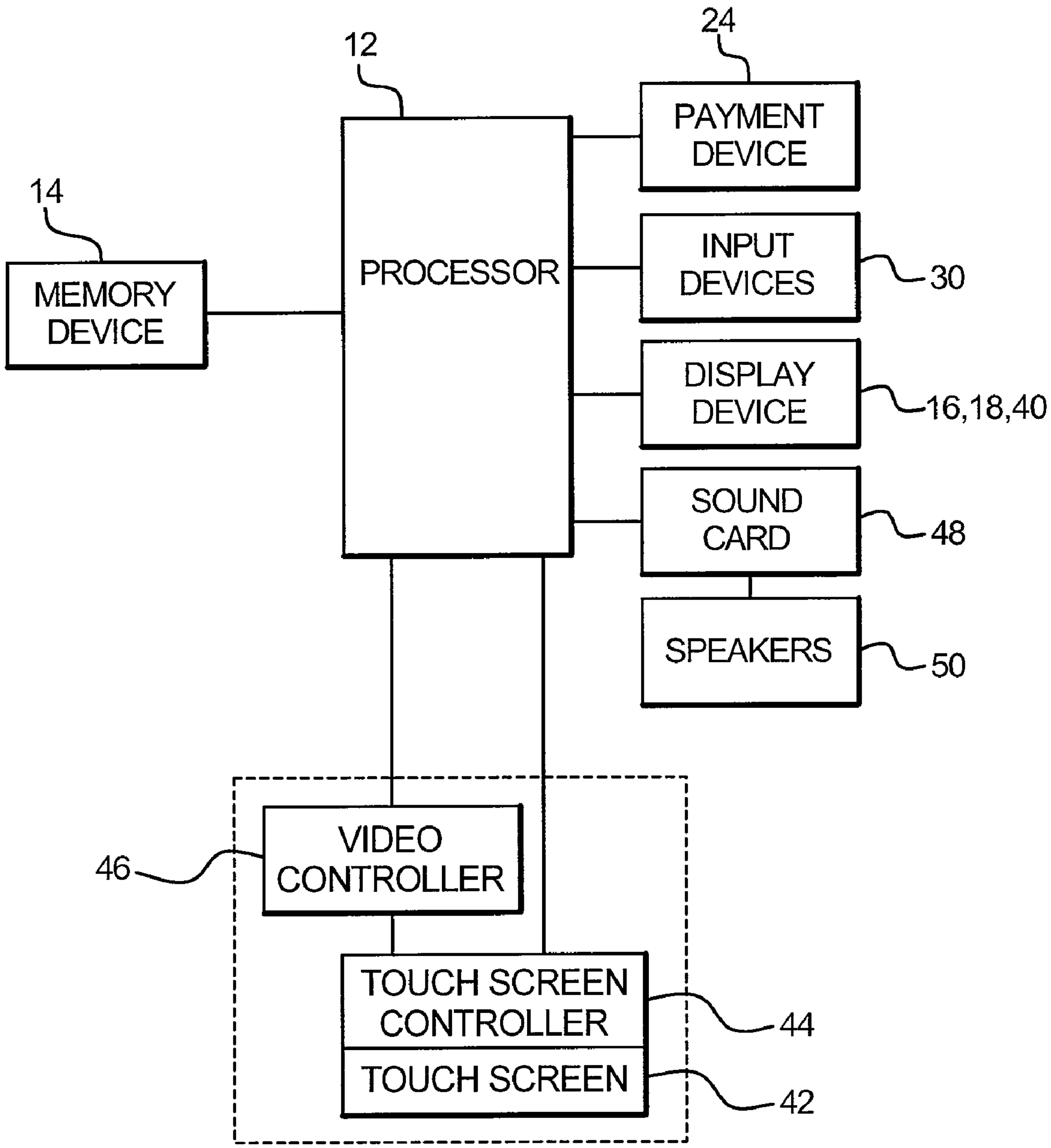
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASICs). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

In one embodiment, the cascading style game is used as a bonus game. In one such embodiment, the gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented. It should be appreciated that the cascading style game could be included in a free spin or a bonus game.

In one embodiment, as illustrated in FIG. 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display, device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
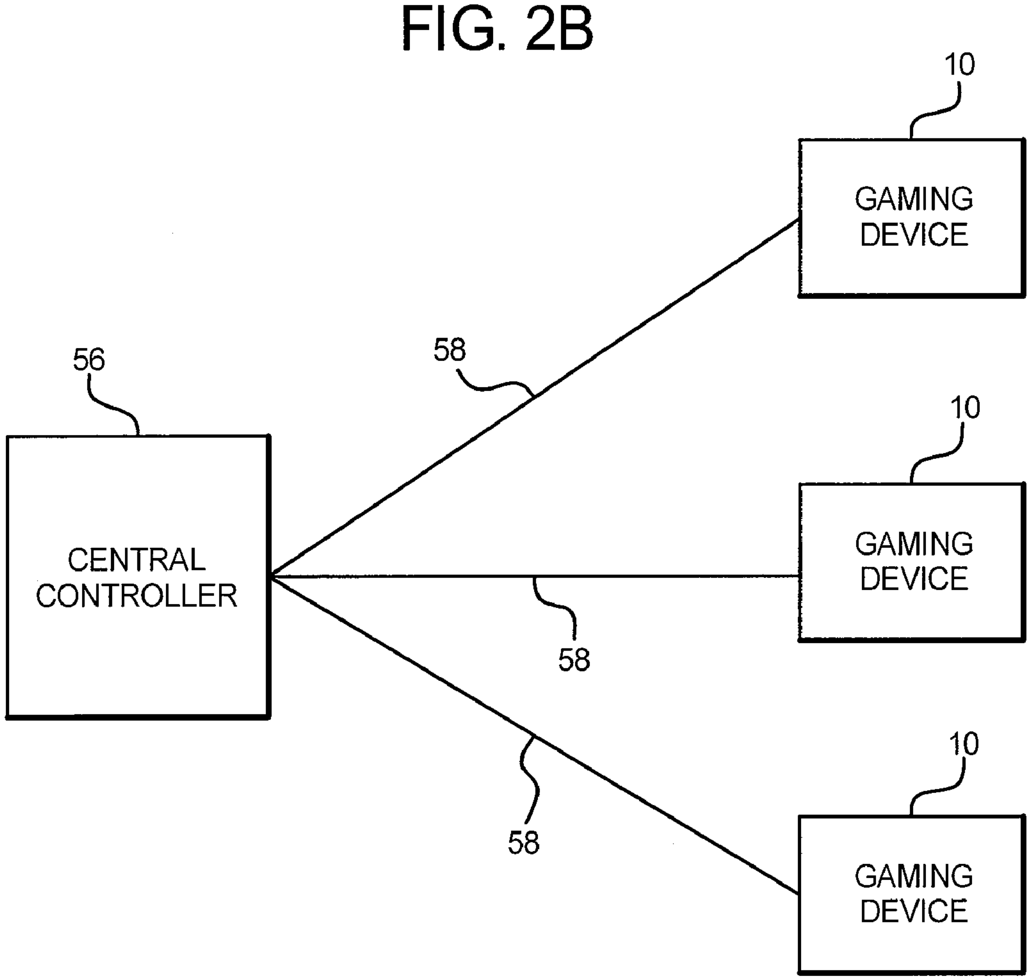
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a format or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Gaming System Having a Plurality of Symbol Blocks

In one embodiment of the present disclosure, a gaming system is configured to display a cascading style game on a display device. The cascading symbol game includes a plurality of different symbol blocks. Each of a plurality of the symbol blocks include a plurality of partial symbols. The partial symbols on each block are arranged in a plurality of different orientations. In various embodiments, a partial symbol has one or more complementary partial symbol(s) which, when appropriately arranged in a designated spatial relationship or orientation with one another, form a complete symbol.

Figure 3:
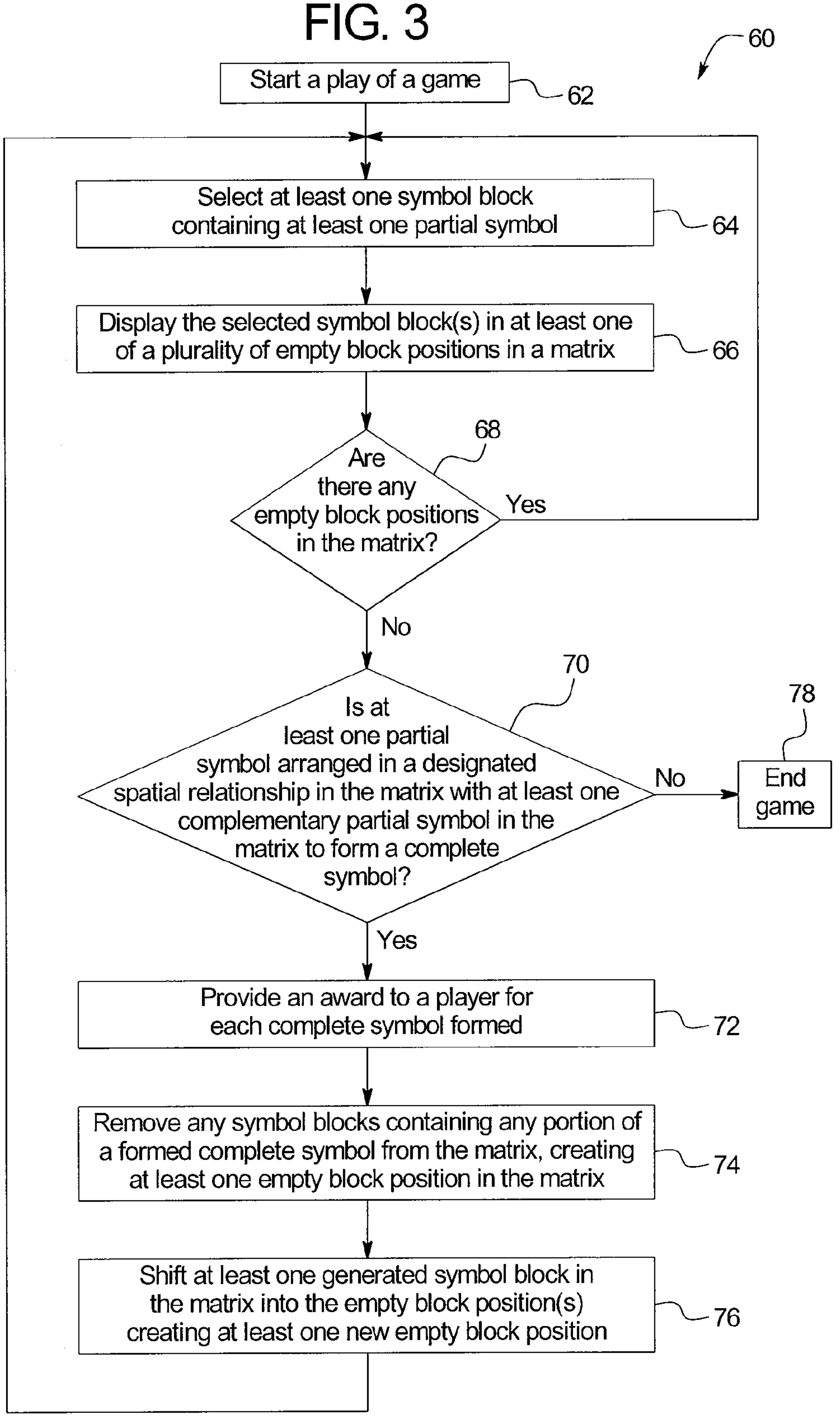
FIG. 3 is a flow chart of an example process for operating a gaming system providing the game including the blocks with partial symbols disclosed herein.

Referring now to FIG. 3, one embodiment of the present disclosure is illustrated, and generally indicated by numeral 60. The gaming system starts a play of the game as indicated by block 62. In one embodiment, the play of the game is initiated by a wager placed by a player. In an alternative embodiment, the play of the game is part of a secondary or bonus game. After starting the play of the game, the gaming system selects a symbol block from a set of symbol blocks, where each symbol block contains a plurality of partial symbols as indicated by block 64. The gaming system then displays each symbol block in one of a plurality of empty block positions in an M×N format, configuration, or arrangement as indicated by block 66.

The gaming system determines whether any of the plurality of block positions in the format do not contain a symbol block as indicated by diamond 68. If the format contains an empty block position, the gaming system is configured to select an additional symbol block from the set of symbol blocks as indicated by block 64, and display the selected symbol block(s) in one of the empty block positions in the format as indicated by block 66. The gaming system repeats these processes until there are no empty block positions remaining in the format.

The gaming system then determines whether a partial symbol is situated in a designated spatial relationship in the format with a complementary partial symbol to form a complete symbol as indicated by diamond 70. For each complete symbol formed, the gaming system is configured to provide an award to the player as indicated by block 72.

Following any award distribution for complete symbols formed, the gaming system removes each matching block, which include all symbol blocks containing any portion of a formed complete symbol from the format as indicated by block 74. Each removed matching block creates an empty block position in the format, as indicated by block 74. Following the removal of each matching block, the gaming system shifts an already selected and displayed symbol block into the empty block position(s) as indicated by block 76. This shifting creates new empty block positions, which include the block position(s) recently vacated by the shifted symbol blocks, as indicated by block 76.

The gaming system then selects new symbol blocks to fill the newly vacated empty block positions as indicated by block 64, and displays the newly selected symbol blocks in the empty block positions in the format as indicated by block 66. The gaming system repeats this process of selecting and displaying symbol blocks and matching partial symbols until no complete symbols are formed. When the gaming system determines in diamond 70 that no partial symbols are arranged in a designated spatial relationship in the format with a complementary partial symbol to form a complete symbol, the game ends as indicated by block 78.

Figure 4A:
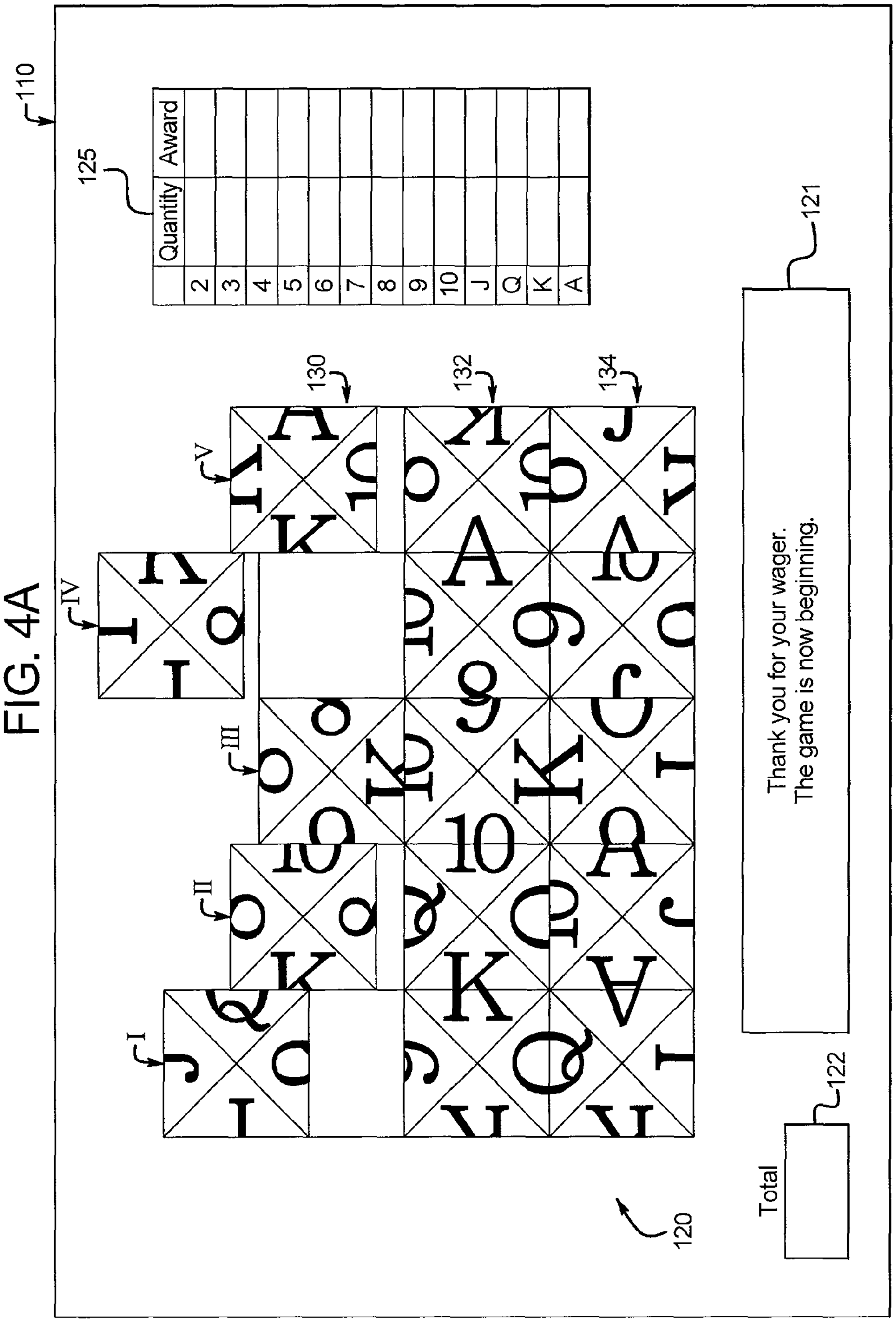
FIGS. 4A, 4B, 4C, 4D, 4E and 4F each illustrate a point in time during one embodiment of a play of the game of the gaming system disclosed herein.

In the illustrated embodiment of FIGS. 4A to 4F, the gaming system starts a play of the game by displaying a 3×5 format on the display device. FIG. 4A illustrates the display device 110 displaying a format 120 which is partially filled with symbol blocks. The format 120 includes three rows 130, 132 and 134 and five columns I, II, III, IV and V. The format 120 creates fifteen block positions defined by the intersections of each row 130, 132 and 134 with each column I, II, III, IV and V. The fifteen block positions are labeled according to the row and column they occupy (i.e., a block position in the first row 130 and the fourth column IV, is labeled 1301V). In FIG. 4A, the gaming system has started a play of the game by selecting a plurality of symbol blocks from a set of predetermined symbol blocks. The gaming system displays each of the selected symbol blocks in a different block position in the format 120. Each block position in the bottom two rows 132 and 134 display a selected symbol block. The remaining five selected symbol blocks to occupy block positions 130I to 130V in the top row are being shifted into position. The display device 110 contains a portion for displaying messages to the player 121 corresponding awards won or other details related to the play of the game. The display device 110 also contains a meter 122 to display the total awards accumulated in the play of the game.

Figure 4B:
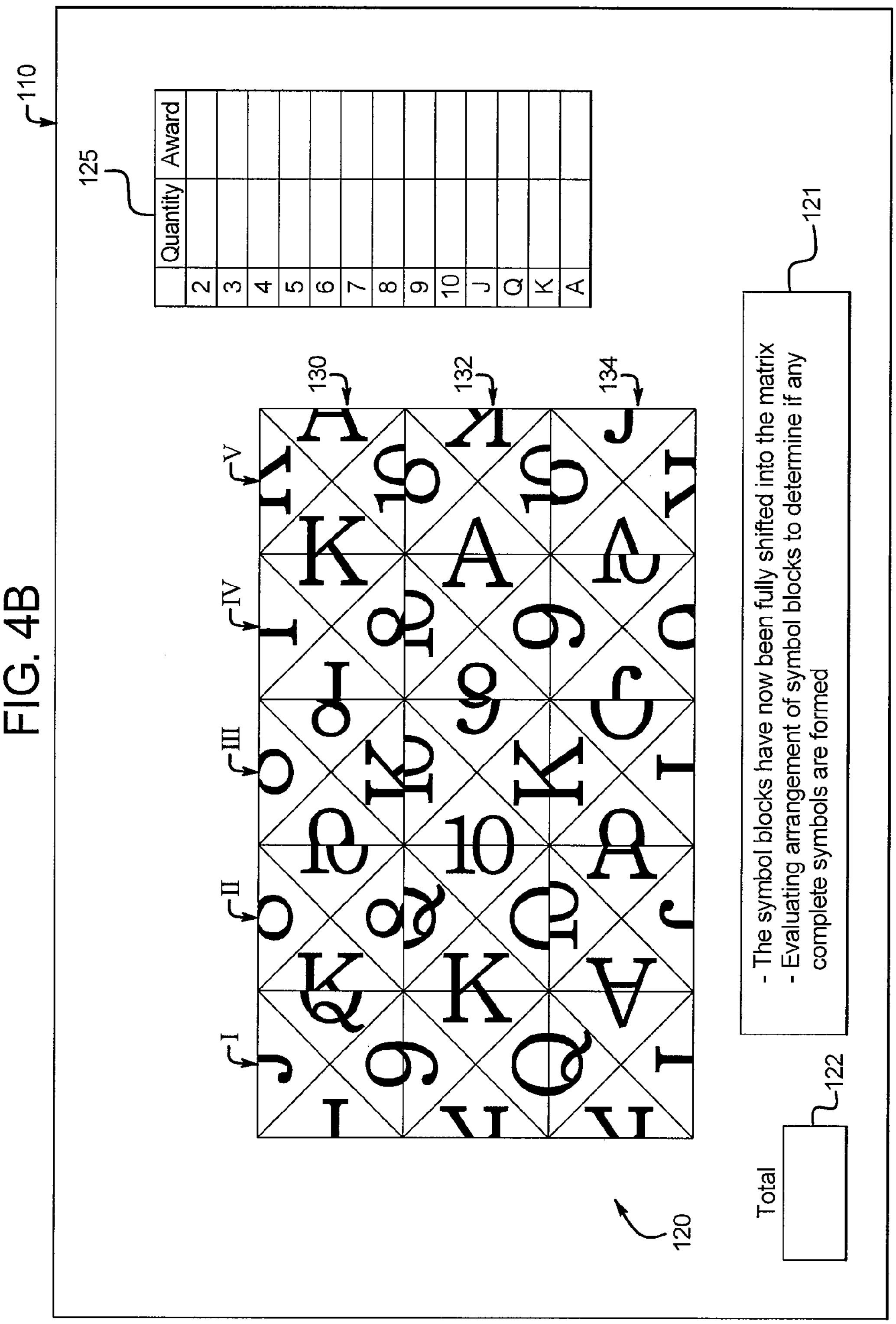

Referring now to FIG. 4B, each of the blocks which were being shifted into position in FIG. 4A have been fully shifted into the 3×5 format 120. As illustrated in FIG. 4B, once the blocks are fully shifted into the format, each partial symbol on each block abuts another partial symbol on a bordering block. In many cases, the partial symbols abutting one another do not match to form a complete symbol. In some cases, however, the partial symbol on one block matches with its corresponding complementary partial symbol on an adjacent block to form a complete symbol. The message display portion 121 of the display device 110 informs the player of what is going on in the game. Specifically, it informs the player: "The symbol blocks have now been fully shifted into the format." It also informs the player that the gaming system is evaluating the arrangement of symbol blocks to determine if any complete symbols are formed.

Figure 4C:
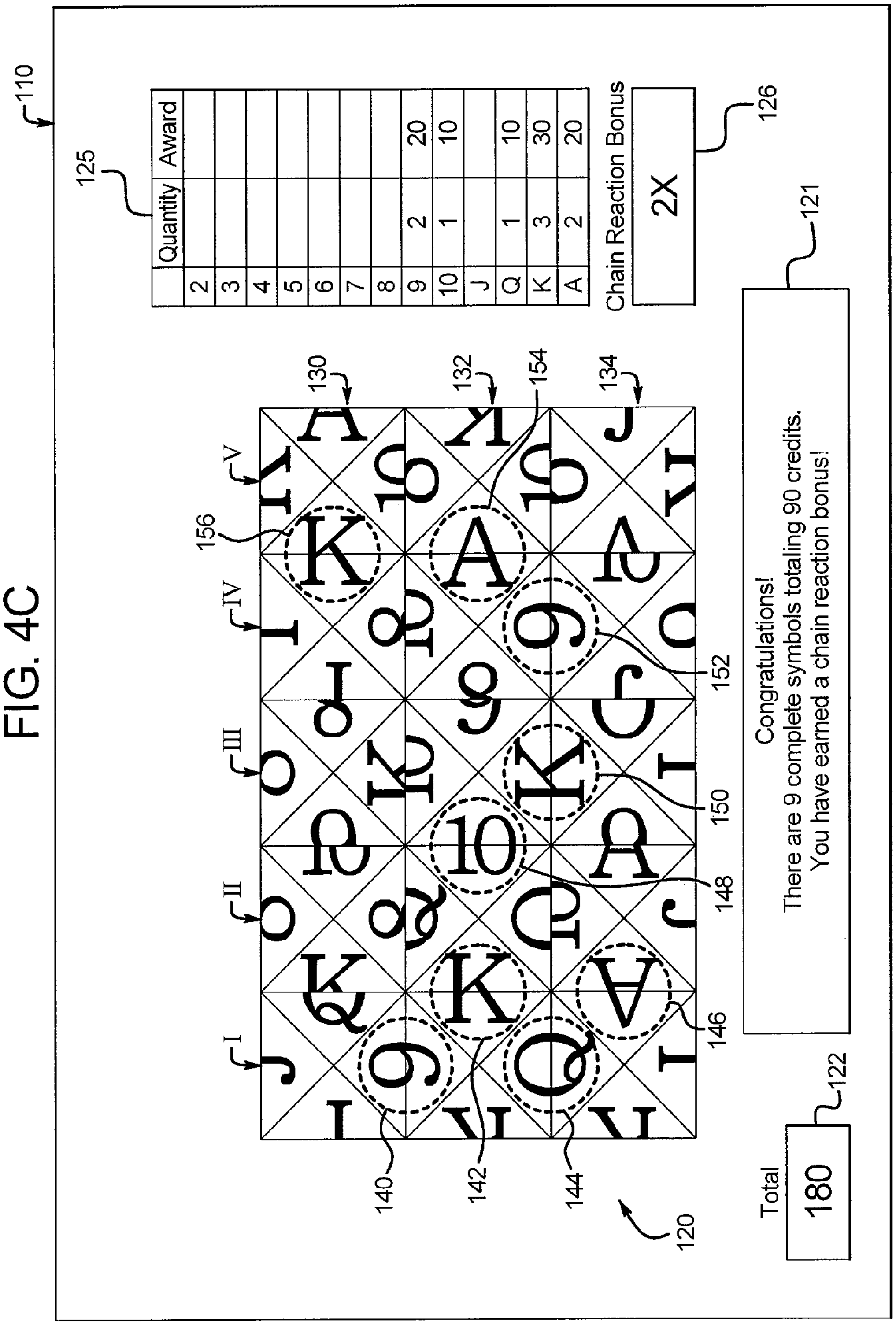

In FIG. 4C, the gaming system has circled or highlighted each of the complete symbols formed within the format 120. Specifically, the gaming system circled the complete symbols of: a number "9" 140; a "Q" 142; a "K" 144; an "A" 146; a number "10" 148; a "K" 150; a number "9" 152; an "A" 154; and a "K" 156. Table 125 of the display device 110 displays to the player a list of each complete symbol in the set of symbols. The table 125 includes a "quantity" column, which indicates how many of each complete symbol were formed, as well as an "award" column, which displays the total award provided to the player for each complete symbol formed.

It should be appreciated that in one embodiment, the gaming system is configured to provide an extra award to the player for a "chain reaction" bonus, in which multiple complete symbols contact one another, as illustrated in FIG. 4C. In the illustrated embodiment, the complete symbols have been arranged to provide a chain reaction bonus award 126. In various embodiments, the chain reaction bonus 126 is a set bonus award amount. In this embodiment, the chain reaction bonus award is a 2× multiplier of all credits awarded from the complete symbols. In the illustrated embodiment, the total credits awarded equals 90 credits; therefore, with the chain reaction bonus 126 of 2×, the player is awarded 180 total credits, as indicated by the award counter 122.

The message display portion 121 congratulates and informs the player of the nine complete symbols formed and the chain reaction bonus 126 which applies due to the arrangement of complete symbols formed. Meter 122 displays to the player the total accumulated award amount of 180 credits.

Figure 4D:
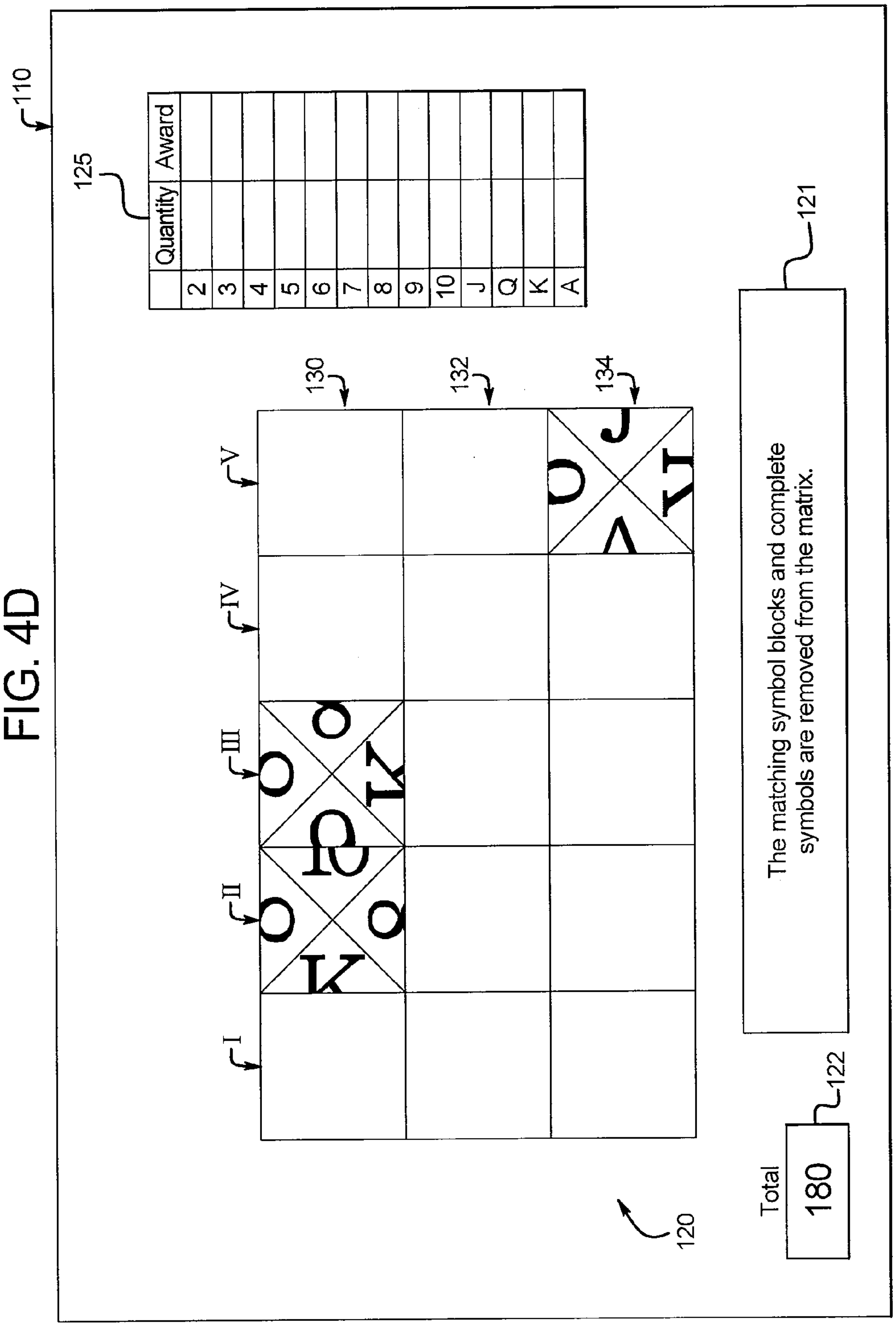
Figure 4E:
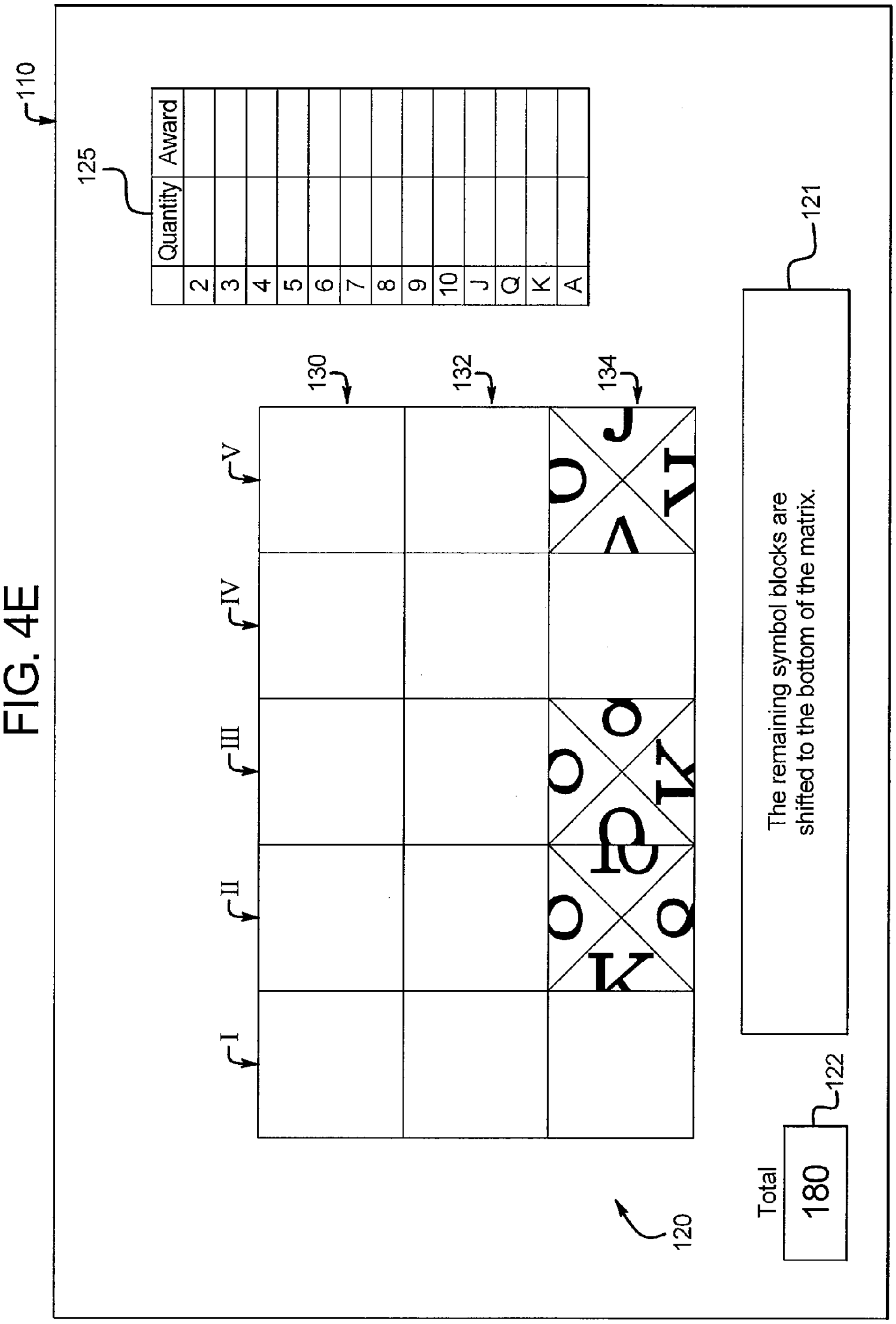

After the gaming system identifies and highlights each of the complete symbols, each symbol block containing a partial symbol which is part of a complete symbol is removed from the format 120. Referring now to FIG. 4D, the gaming system has removed each matching symbol block containing a partial symbol which matched with another partial symbol to form a complete symbol. The only three symbol blocks that remain after removing each matching symbol block are the blocks in block positions 130II, 130III, and 134V. The gaming system then shifts the remaining blocks toward the bottom of the format 120. As shown in FIG. 4E, the blocks that occupied block positions 130II and 130III have been shifted to the bottom row 134 of columns II and III respectively.

Figure 4F:
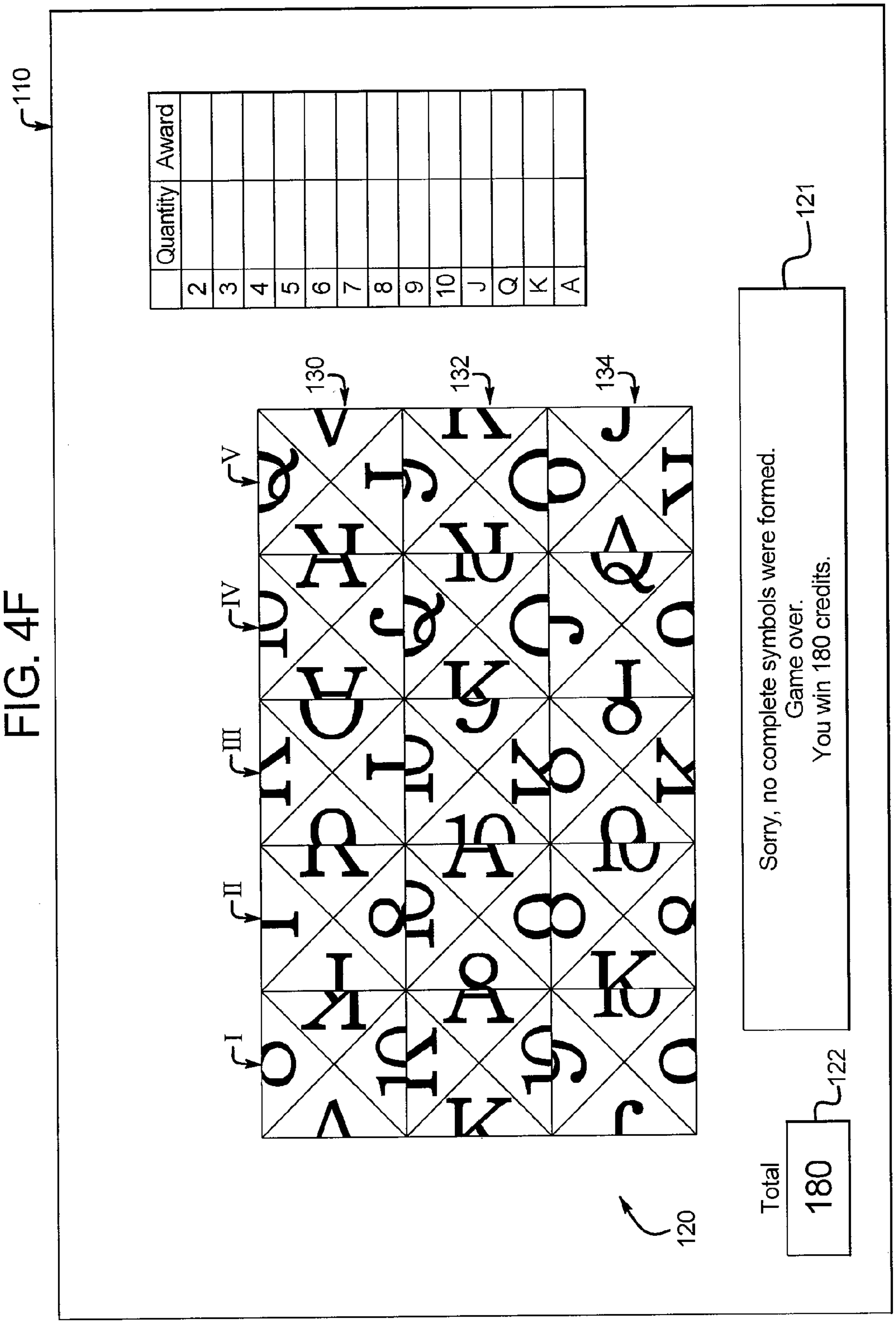

Referring now to FIG. 4F, the gaming system selects new symbol blocks from the set of symbol blocks to fill all vacancies that resulted from removing each matching symbol block from the format. After selecting the new symbol blocks, the gaming system shifts them into the format until there are no more empty block positions remaining in the format 120. After the format is full, the gaming system is configured to evaluate the blocks and once again determine if there are any partial symbols within a designated spatial relationship to their corresponding partial symbols to form a complete symbol. In FIG. 4F, no complete symbols are formed, so the game is over and the gaming system provides all awards to the player. It should be appreciated that, if any complete symbols are formed, the game continues. In one embodiment, the game will only continue if a designated number of complete symbols are formed.

Figure 5A:
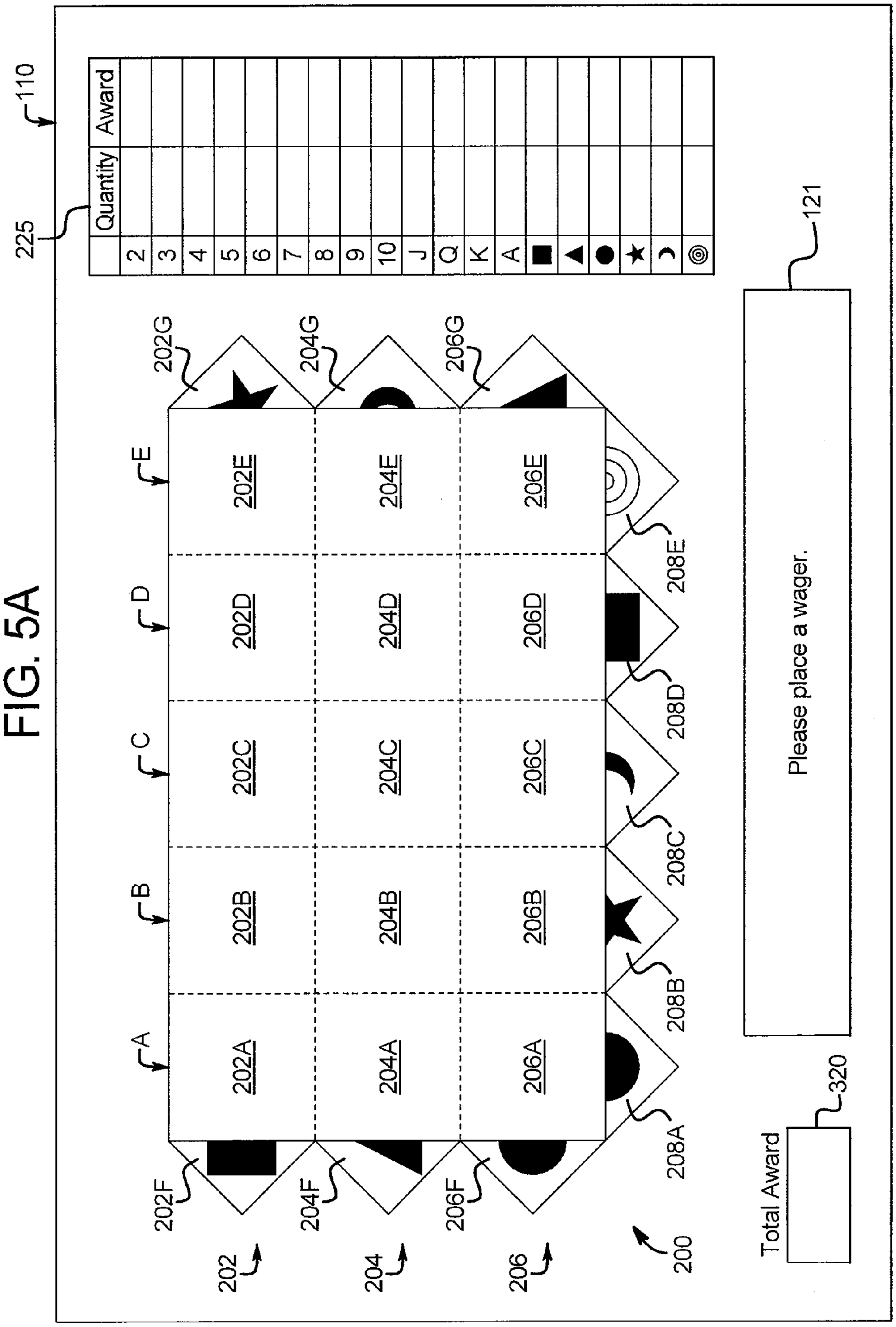
FIGS. 5A, 5B, 5C, 5D, 5E, 5F, 5G, 5H, and 5I each illustrate a point in time during an alternative embodiment of a play of the game of the gaming system disclosed herein.

In the illustrated embodiment of FIGS. 5A to 5I, the gaming system starts a play of the game by displaying a 3×5 format 200 on the display device. FIG. 5A illustrates the format 200, which includes three rows 202, 204, 206, and five columns, A, B, C, D, E. Similar to the embodiment illustrated in FIGS. 4A to 4F, the format 200 creates fifteen block positions 202A to 202E; 204A to 204E; 206A to 206E, defined by the intersections of each row 202, 204, 206 with each column A, B, C, D, E. The fifteen block positions are labeled according to the row and column they occupy (i.e., a block position in the second row 204 and the third column C, is labeled 204C).

In addition to the steps of the above-discussed embodiment, the gaming system of FIGS. 5A to 5I also randomly selects and displays a plurality of border symbol blocks depicted by numerals 202F, 202G; 204F, 204G, 206F, 206G; and 208A to 208E. The border symbol blocks are arranged outside of the periphery of the format 200, and each border symbol block contains a partial symbol. For example, border symbol block 208A contains the depiction of one half of a circle symbol, 208B contains the depiction of one half of a star symbol, and 208C contains the depiction of one half of a moon symbol. Each partial symbol illustrated on a border symbol block has at least one complimentary partial symbol which, when arranged within a designated spatial relationship the partial symbol on the border symbol block, forms a complete border symbol. It should be appreciated that the border symbol blocks described are not located within the format 200; rather they are arranged exterior to but along the left border, right border and bottom border of the format 200. It should also be appreciated that border symbol blocks can be arranged along the top border of the format.

Similar to the above illustrated embodiment, FIG. 5A includes a message portion 121 of the display device 110 to display information and messages to the player. In FIG. 5A, the message portion 121 instructs the player to: "please place a wager." FIG. 5A also includes a table 225, which displays each complete symbol in the set of symbols, a corresponding "quantity" column, and an "award" column, similar to the above illustrated embodiment. It should be appreciated that the table 225 also includes each of the border symbol blocks from the set of symbol blocks.

Figure 5B:
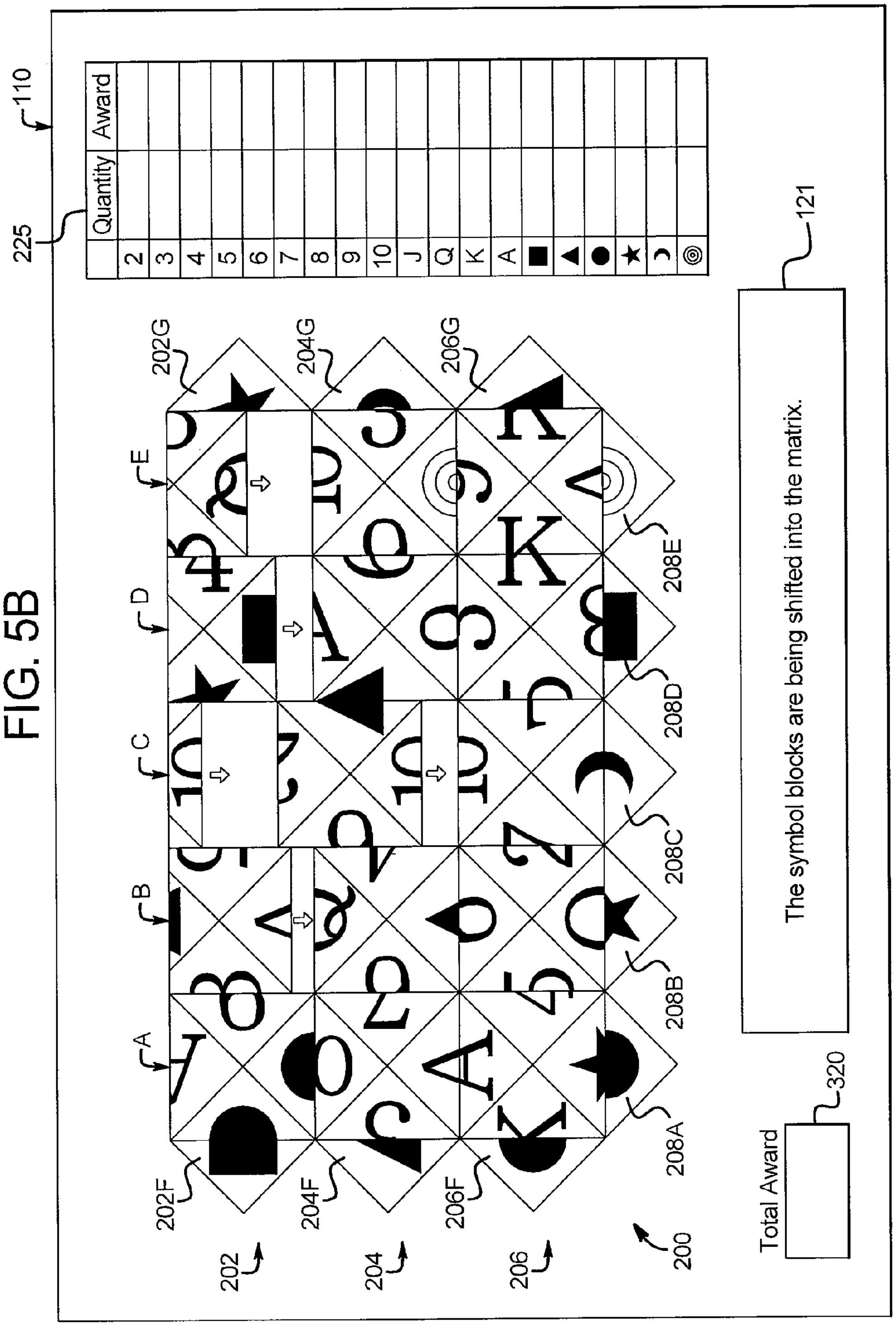

Referring now to FIG. 5B, the gaming system has started the first play of the game as indicated by block 330A. The gaming system randomly selects and displays a plurality of square-shaped center symbol blocks from a set of symbol blocks to occupy each of the fifteen block positions in the format 200. It should be appreciated that, for illustrative purposes, one such center symbol block in FIG. 5B is identified by numeral 250, and will be described in detail. Each of the other center symbol blocks in the format contain substantially similar attributes as center symbol block 250. Center symbol block 250 is divided into four quadrants 250A, 250B, 250C, 250D. Each quadrant contains a partial symbol arranged in any one of a plurality of different orientations. For example, quadrant 250A of center symbol block 250 contains a portion of a symbol depicting a number "2" oriented sideways, quadrant 250B contains a portion of a symbol depicting a number "8" oriented sideways, quadrant 250C contains a portion of a symbol depicting an equilateral triangle, and quadrant 250D contains a portion of a symbol depicting a number "10" oriented normally. Each of these displayed partial symbols has a corresponding complementary partial symbol, which when appropriately arranged next to the displayed partial symbols, will form a complete symbol. For example, one of the blocks includes a complementary partial symbol that depicts a portion of the number "2" oriented sideways which, when arranged adjacent to the border of center symbol block 250 created by quadrant 250A, forms a complete symbol showing a number "2".

The gaming system selects the center symbol blocks from a set of symbol blocks and displays them in each column A, B, C, D, E at the top of the format 200, and then shifts the selected symbol blocks toward the bottom of the format 200. As illustrated in FIG. 5B, each block position 206A, 206B, 206C, 206D, 206E in the bottom row 206 of the format 200 has been occupied with various selected center symbol blocks. In the middle row 204, each of block position 204A, 204B, 204D, and 204E has also been filled with center symbol blocks. Block position 204C, however, is partially vacant, and FIG. 5B shows center symbol block 250 sliding downward into block position 204C to complete the middle row 204. The top row 202 of the format 200 has only one center symbol block in place in block position 202A of the first column A. Each of the other four columns, B, C, D, E are partially empty, with newly selected center symbol blocks sliding into place from the top of the format 200. The gaming system continues this process of selecting new center symbol blocks from the set of symbol blocks, displaying the selected blocks in each column A, B, C, D, E and shifting them from the top to the bottom of the format 200 until the entire format 200 no longer has any empty block positions.

Figure 5C:
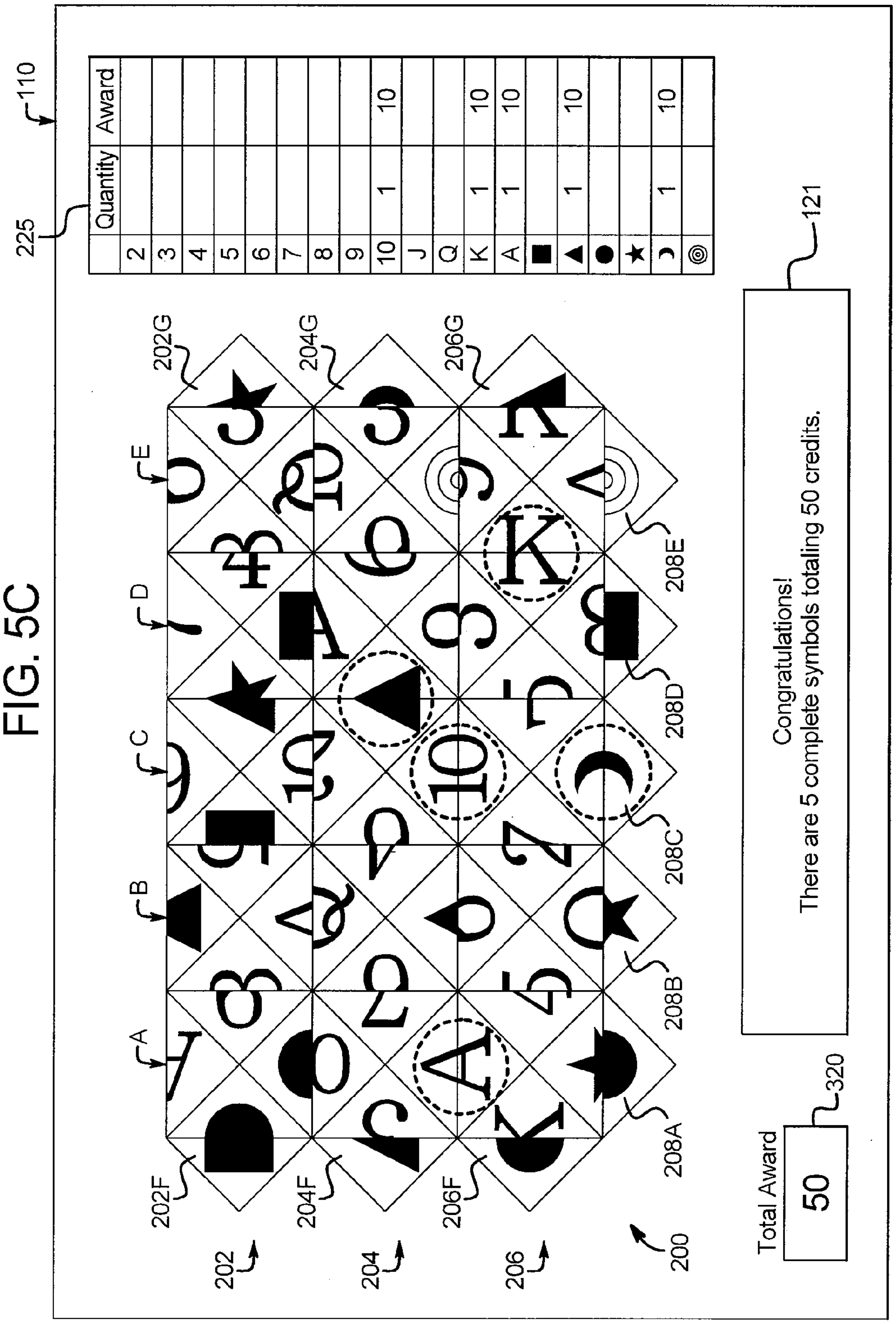

Referring now to FIG. 5C, each block position in the format 200 is occupied by a center symbol block, and the format no longer contains any empty block positions. The gaming system now determines whether any center symbol blocks are arranged such that a partial symbol on one of the center symbol blocks is adjacent to and correctly oriented with its corresponding complementary partial symbol on another center symbol block or border symbol block to form a complete symbol. The four partial symbols of center symbol block 250, for example, each abut a separate partial symbol displayed on one of four surrounding center symbol blocks occupying block positions 204B to the left, 204D to the right, 202C on the top, and 206C on the bottom. The abutting partial symbols displayed on each of the surrounding center symbol blocks could be a complementary partial symbol to one of the following four partial symbols shown on block 250: the partial symbol in quadrant 250A; the partial symbol in quadrant 250B; the partial symbol in quadrant 250C; and the partial symbol in quadrant 250D. In FIG. 5C, the partial symbol depicting a portion of a number "10" in quadrant 250D is now adjacent to its complementary partial symbol depicting a portion of a number "10" on the abutting quadrant 260A of center symbol block 260, the symbol block occupying block position 206C. The partial symbol from quadrant 250D and the abutting partial symbol in quadrant 260A of center symbol block 260 are both oriented normally, and therefore match to form a complete symbol of a number "10". The gaming system then highlights the complete symbol of the number "10" formed by the abutting partial symbols in quadrants 250D and 260A of center symbol blocks 250 and 260 respectively.

As discussed above, the gaming system of this embodiment includes a plurality of border symbol blocks (e.g., the row bordering the bottom of the format includes border symbol blocks 208A to 208E) arranged around the outer periphery of the format, each border symbol block including a partial symbol. The border symbol blocks enable the partial symbols displayed in any wall-facing quadrants (i.e., quadrants which share a border with the periphery of the format) of center symbol blocks within the format the opportunity to match with corresponding complementary partial symbols that may be displayed in a border symbol block. Center symbol block 260 also contains a partial symbol of the depiction of one half of a moon symbol in quadrant 260B. Although center symbol block 260 is on the bottom row 206, and quadrant 260B is a wall-facing quadrant of the center symbol block 260, the partial symbol displayed in quadrant 260B can still match with a complementary partial symbol to create a complete symbol. In FIG. 5C, the partial symbol of a half moon displayed in quadrant 260B matches with its complementary partial symbol of another half-moon, which is displayed in the border symbol block 208C to form a complete border symbol. The gaming system highlights the complete border symbol of the moon formed by the abutting border symbol block 208C and the wall-facing quadrant 260B of center symbol block 260.

In addition to the complete symbol of the number "10" formed, as well as the complete border symbol of the moon formed, the play of the game depicted in FIG. 5C includes three other complete symbols formed by partial symbols arranged adjacent to and correctly oriented with one another across different center symbol blocks. For example, quadrant 250C of center symbol block 250 includes the depiction of one half of a triangle. Correspondingly, the partial symbol in the abutting quadrant of center symbol block in block position 204D contains the complementary partial symbol of the depiction of the other half of the triangle displayed in quadrant 2500, oriented in the same direction. Therefore, a complete symbol of a triangle is formed and highlighted by the gaming system. Additionally, a complete symbol of a sideways "K" is formed by the partial symbols displayed in abutting quadrants of the center symbol blocks occupying block positions 206D and 206E. The gaming system highlights this complete symbol of "K". It should be appreciated that, even though the "K" is rotated 90 degrees clockwise from its normal upright orientation, the "K" formed by the two partial symbols is still a complete symbol since each partial symbol is oriented with a similar 90 degree rotation. Finally, the play illustrated in FIG. 5C includes a complete symbol of "A" formed by the abutting partial symbols in quadrants of center symbol blocks occupying the block positions of 204A and 206A. The gaming system also highlights this complete symbol of "A".

FIG. 5C includes five separate complete symbols. The gaming system provides an award of 10 credits to the player for each of the four complete symbols formed within the format 200, and an award of 10 credits for the complete border symbol formed between the wall-facing quadrant 260B and the border symbol block 208C. The gaming system provides a total award of 50 credits to the player. Table 225 indicates to the player that one "10" symbol was formed worth 10 credits, one "K" symbol was formed worth 10 credits, one "A" symbol was formed worth 10 credits, one triangle symbol was formed worth 10 credits, and one moon symbol was formed worth 10 credits. The message portion 121 of the display device 110 then displays to the player: "Congratulations! Five complete symbols were formed for a total of fifty credits."

Figure 5D:
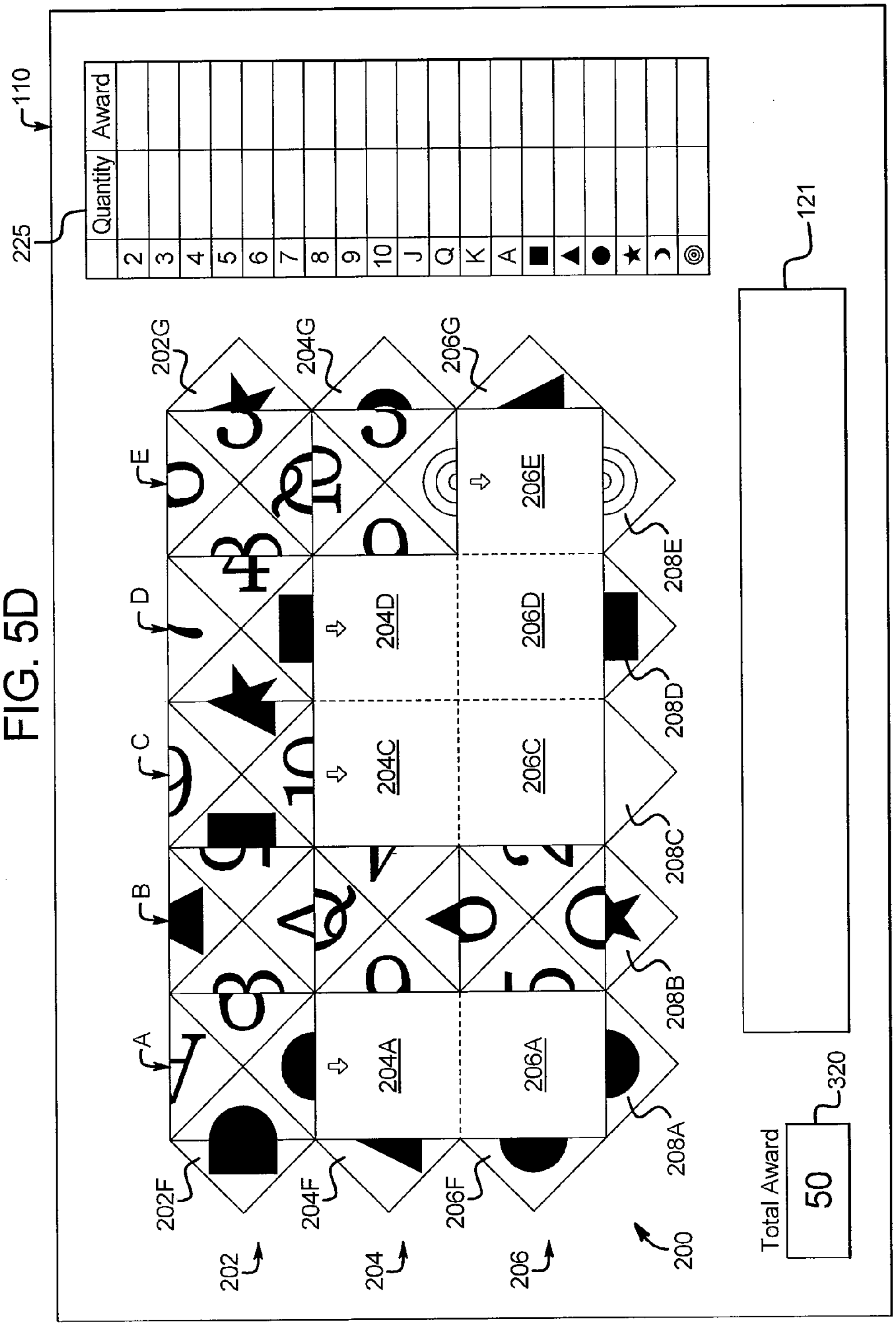

After identifying each complete symbol formed and providing a corresponding award for the complete symbols formed, the gaming system proceeds to remove the complete symbols from the format. Specifically, as depicted in FIG. 5D, the gaming system removes each matching block which contains at least one quadrant displaying a partial symbol used to form a complete symbol. This removal of every matching block leaves two empty block positions in the format 200 for each complete symbol formed. For example, two quadrants 250C and 250D of center symbol block 250 contained partial symbols used to form complete symbols. Therefore, the gaming system removes the entire matching block 250 from the format, thereby leaving an empty block position at block position 204C. Further, symbol block 260 qualified as a matching block because quadrant 260A and quadrant 260B each contained partial symbols which combined to form a complete symbol. Therefore, matching block 260 is removed from the format, leaving an empty block position in block position 206C. It should be appreciated that border symbol block 208C has also been removed, and so it no longer displays a partial symbol in that position. For the remainder of the game, any subsequent wall-facing quadrant that abuts the block position which contained border symbol block 208C cannot form a complete symbol. Similar to the above-described removal of matching blocks 250 and 260, as shown in FIG. 5D, the gaming system also removes the matching blocks which occupied block positions 204A, 206A, 204D, 206D and 206E, creating seven total empty block positions in the middle row 204 and the bottom row 206 of the format 200.

Following the removal of all matching blocks, the gaming system prepares to shift the selected and displayed center symbol blocks still occupying block positions in the format from the top down into any empty block positions. As shown by the arrows in FIG. 5D, the gaming system starts to shift the center symbol block occupying block position 202A downward toward the empty block positions resulting from the removal of the matching blocks which occupied block positions 204A and 206A during the first play of the game. Similarly, the selected center symbol blocks occupying block positions 202C and 202D are shifted downward toward the bottom of the format toward the empty block positions 204C, 206C and 204D, 206C respectively. There were no matching blocks in column B in the first play of the game, so none of the selected center symbol blocks in column B are shifted prior to the second play of the game. The gaming system shifts the selected center symbol blocks occupying block positions 204E and 202E downward toward the empty block position 206E.

Figure 5E:
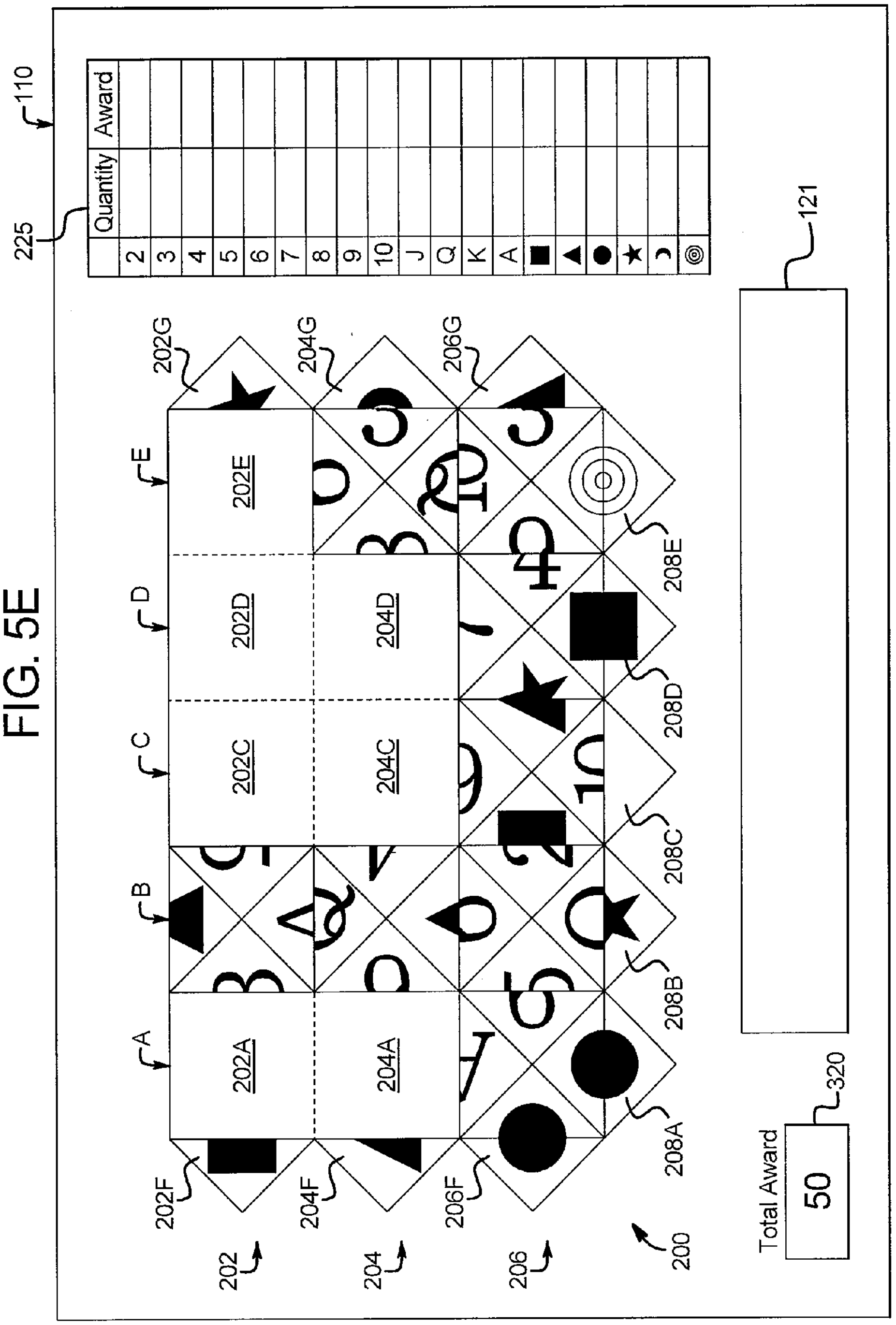

Referring now to FIG. 5E, the gaming system has shifted each selected and displayed center symbol block down in the format as far as it can go until there are no longer any empty block positions below any selected and displayed center symbol blocks. As a result of this shifting, all empty block positions in the format are now at to the top of each column A, C, D, E in the format. Specifically, block positions 202A, 204A, 202C, 204C, 202D, 204D, and 202E are now empty block positions. Before the gaming system can evaluate a second play of the game, the format must not have any empty block positions. Therefore, the gaming system randomly selects at least one new center symbol block from the set of symbol blocks and displays the selected block(s) at the top of each of the columns with empty block positions A, C, D, E.

Similar to the process of selecting symbol blocks and displaying them to fill the block positions of the format at the beginning of the play of the game, as described above and generally illustrated in FIG. 5B, the gaming system shifts each newly selected center symbol block from the top of each of column A, C, D, E downward until the center symbol block occupies the bottom-most empty block position in that column. For example, a newly selected center symbol block displayed in column A would be shifted from the top of the format down to block position 204A, because block position 204A is the lowest empty block position in column A. Following the shift of a newly selected center symbol block into block position 204A, the gaming system selects and displays yet another new center symbol block from the set of symbol blocks because column A still has one empty block position 202A. This second new center symbol block slides into empty block position 202A, to complete column A. The gaming system repeats this center symbol block selection, display and sliding in each column containing at least one empty block position until the entire format no longer contains any empty block positions.

Figure 5F:
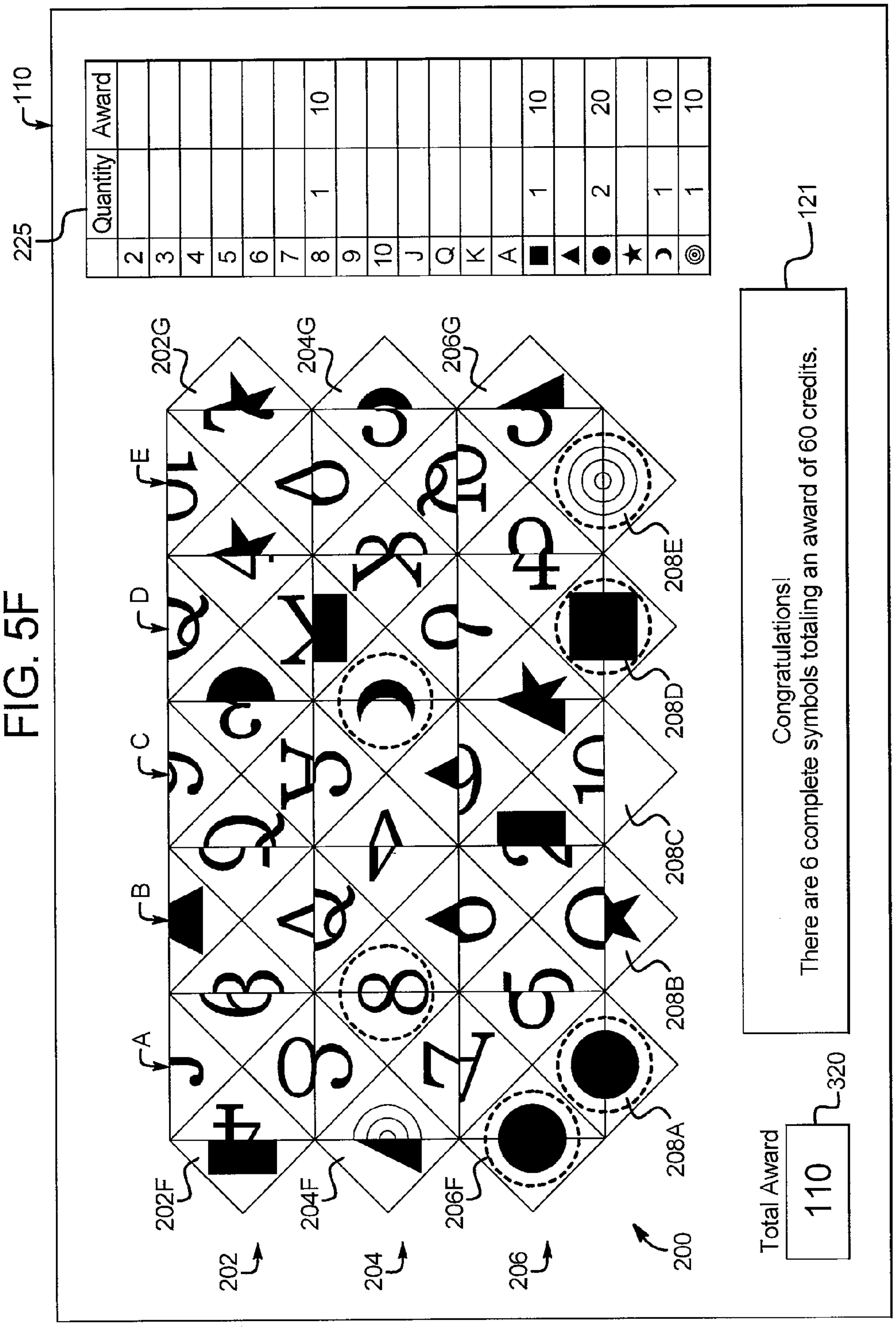

As illustrated in FIG. 5F, the gaming system has selected and displayed seven new symbol blocks according to the above-described procedure to occupy the empty block positions 202A, 204A, 202C, 204C, 202D, 204D, and 202E. The format 200 shown in FIG. 5F has no empty block positions, so the gaming system is ready to evaluate the partial symbols to determine whether or not any complete symbols are formed by the combination of any partial and complementary partial symbols.

In FIG. 5F, six complete symbols are formed by a plurality of center symbol blocks and border symbol blocks. First, the partial symbols displayed in two quadrants of the center symbol block occupying block position 206A match with corresponding complimentary partial symbols displayed in abutting border symbol blocks 208A and 206F. The gaming system identifies these two complete border symbols and highlights them. Second, the partial symbols displayed in border symbol blocks 208D and 208E match with their respective complementary partial symbols displayed in the wall-facing quadrants of the center symbol blocks occupying block positions 206D and 206E respectively. Therefore, the gaming system identifies and highlights each of these complete border symbols.

It should be appreciated that the complete border symbols formed by the partial symbols displayed in border symbol blocks 206F and 208A with the complementary partial symbols displayed in the wall-facing quadrants of the center symbol block occupying block position 206A are both solid circles. Additionally, the complete border symbols formed by the partial symbols displayed in border symbol block 208D and 208E with their corresponding complimentary partial symbols are a solid square and a series of concentric circles, respectively. Each of these four complete border symbols are reflectively symmetrical along a vertical and horizontal axis. Therefore, in this instance, the orientation of the partial symbol and the complimentary partial symbol is irrelevant to whether or not they combine to form a complete symbol.

Referring once again to FIG. 5F, the center symbol blocks occupying block positions 204C and 204D combine to form a complete symbol in the correct orientation displaying a moon, and the center symbol blocks occupying block positions 204A and 204B combine to form a complete symbol in the correct orientation displaying the number "8". After identifying these two complete symbols, the gaming system highlights them.

The gaming system then provides an award for each complete symbol formed in the second play of the game. In this embodiment, the gaming system provides an award of 10 credits for each complete symbol formed, and 10 credits for each complete border symbol formed. Therefore, the gaming system provides a total of 10 credits for one complete symbol, and 50 credits for a total of five complete border symbols, totaling 60 credits. When added to the 50 credits from FIG. 5C, the total accumulated credits for this game so far equals 110 credits. It should be appreciated that, in various embodiments, a complete border symbol is worth a higher award than a complete symbol formed.

Figure 5G:
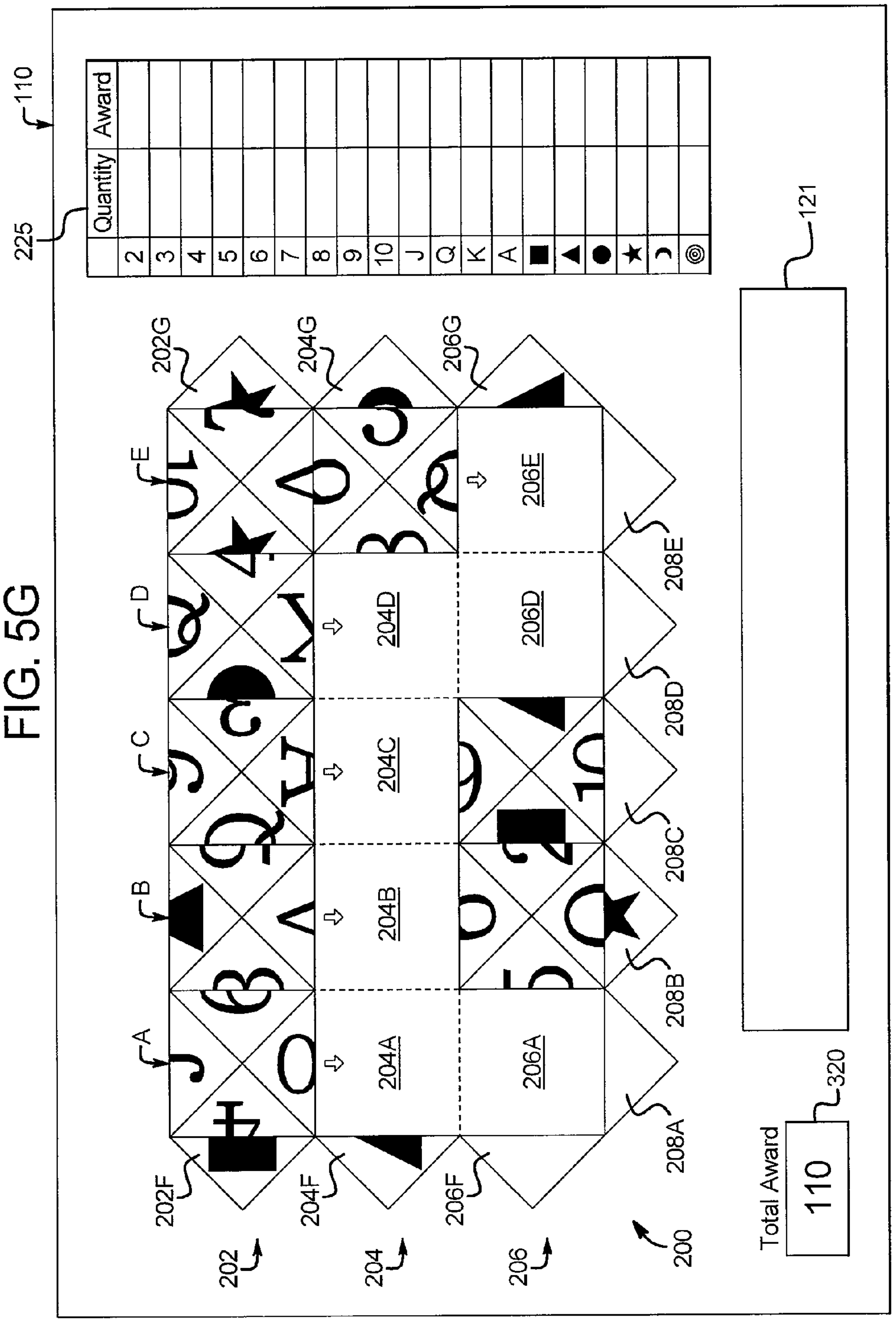

Referring now to FIG. 5G, the gaming system proceeds to remove each matching block containing a quadrant displaying a partial symbol which formed part of a complete symbol or complete border symbol. This removal results in empty block positions in block positions 204A, 206A, 204B, 204C, 204D, 206D, and 206E. Additionally, the removal of each complete border symbol results in the border symbol block occupying border block positions 206F, 208A, 208D and 208E being removed as well. Similar to when border symbol block 208C was removed after the first play of the game, none of border symbol blocks 206F, 208A, 208D, or 208E will be replaced with newly selected border symbol blocks. These empty border symbol blocks will remain empty for the remainder of this play of the game. The gaming system begins shifting the center symbol blocks occupying block positions 202A, 202B, 202C, 202D, 204E, and 202E downward toward the empty block positions in the format.

Figure 5H:
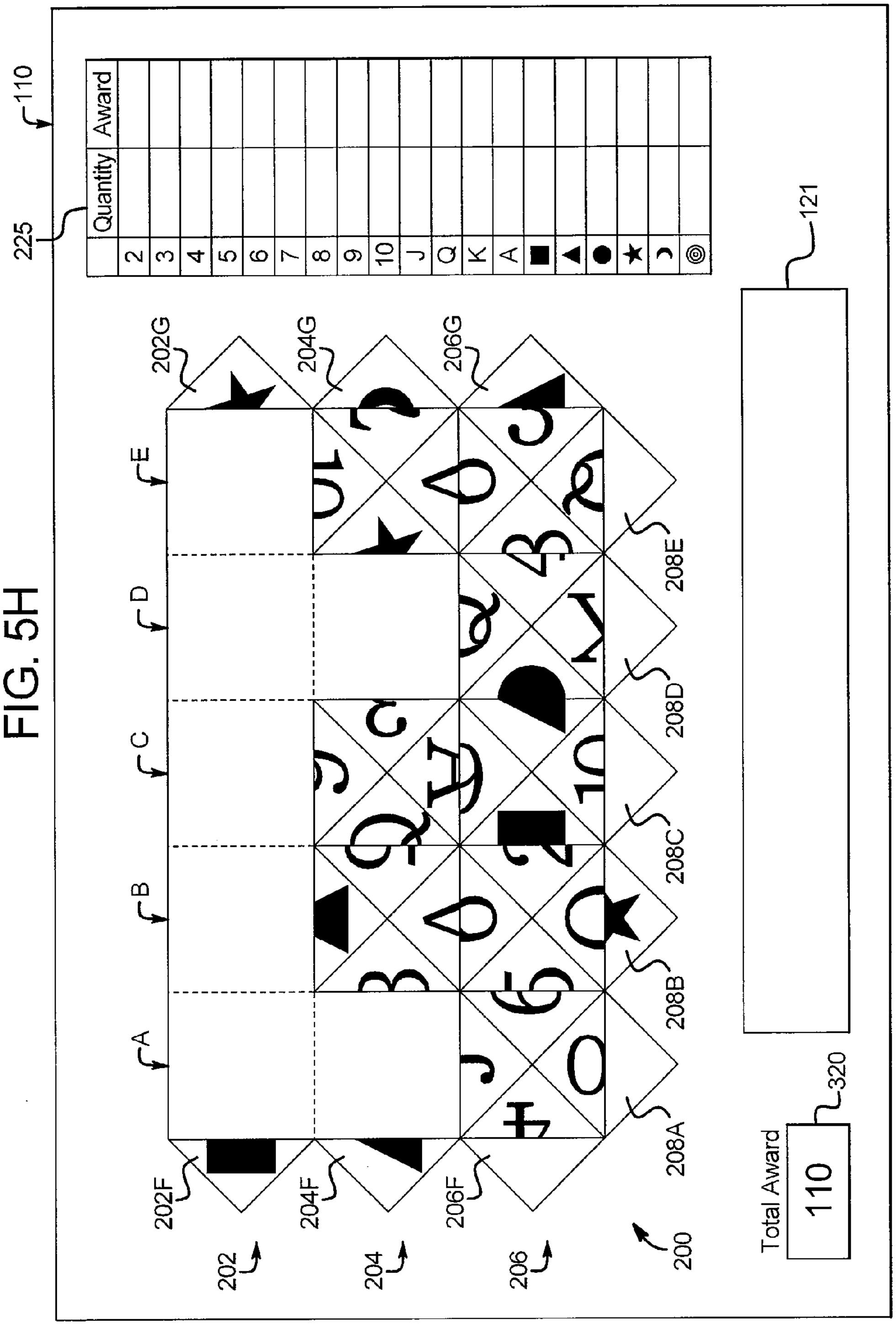

Referring now to FIG. 5H, each of the above-referenced symbol blocks have been shifted downward in the format to occupy the lowest empty block positions. As a result, each of the columns A, B, C, D, E have empty block positions only toward the top of the format 200. The gaming system begins the process of randomly selecting new center symbol blocks from the set of symbol blocks, displaying them at the top of each column, and shifting them downward until the lowest empty block position in that particular column is occupied. Alternatively, there could be a predetermined number of center symbol blocks selected, which are displayed when empty block positions appear throughout the game.

Figure 5I:
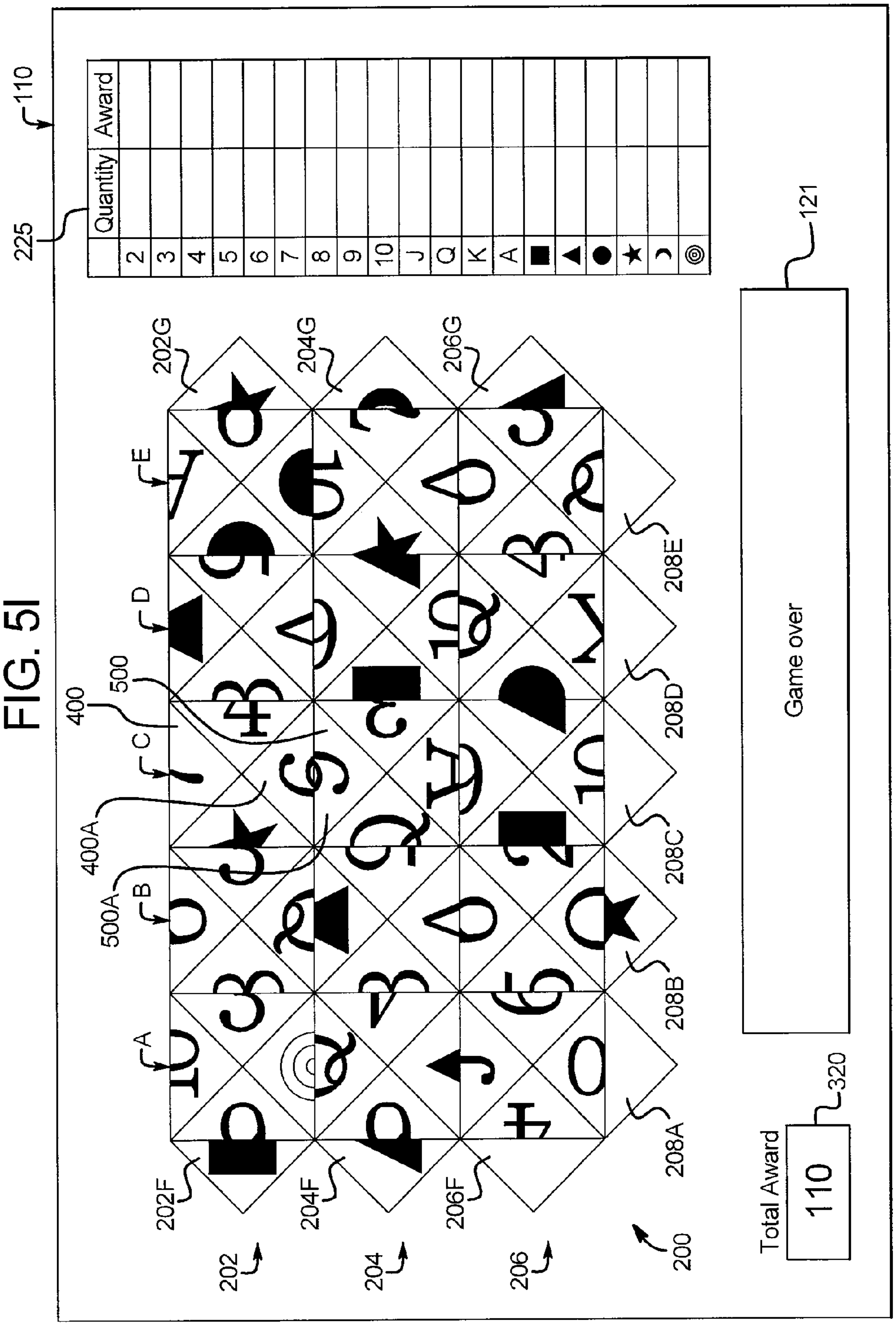

Referring now to FIG. 5I, the gaming system has selected and displayed seven new center symbol blocks, and shifted them into the format until no empty block positions remain. At this point, the gaming system evaluates the new arrangement of symbol blocks displayed, and determines that there are no complete symbols or complete border symbols. Therefore, the gaming system accumulates zero credits for complete symbols formed and zero credits for complete bonus symbols formed. As a result, the game ends, and the player is awarded the 110 credits accumulated in the game, as indicated by 121.

It should be appreciated that, unless the partial symbol and its complementary partial symbol are oriented correctly in relation to one another, they will not form a complete symbol, even if in abutting quadrants. For example, the center symbol block 400 occupying block position 202C contains a partial symbol of a number "6" in quadrant 400A. Further, center symbol block 500 occupying block position 204C contains a partial symbol of a number "6" in quadrant 500A. Quadrants 400A and 500A abut one another and share a border, however the two partial symbols of the number "6" do not combine to form a complete symbol. As seen on FIG. 5I, the partial symbol in quadrant 400A is the upper half of a number "6" oriented normally, and the partial symbol in quadrant 500A is also the upper half of a number "6", however it is oriented up-side down. As a result, the partial symbol in 400A is not a complementary partial symbol to that in 500A; rather, they are identical partial symbols. In some circumstances, such as the case of symmetrical symbols, a partial symbol and its complementary partial symbol can be identical. However, in this embodiment, when the complete symbol is not symmetrical along any of the vertical or horizontal bisecting axes, it must be properly oriented to form a complete symbol.

In one embodiment, the gaming system is configured to randomly select a plurality of symbol blocks from a predetermined set of symbol blocks. The gaming system is configured to display the selected symbol blocks in a cluster. In one such embodiment, the cluster of symbol blocks is shaped as a rectangular M×N format of symbol blocks. In another embodiment, the cluster of symbol blocks is shaped as a triangle. In yet another embodiment, the cluster of symbol blocks is shaped as an octagon. It should be appreciated that the plurality of symbol blocks can be arranged in any suitable cluster shape. In one embodiment, the gaming system is configured to display the symbol blocks in dependent or independent reels as generally described above.

In various embodiments, the gaming system is configured to select and display a plurality of differently shaped symbol blocks. In one embodiment, each symbol block within the format is the same shape for a play of the game. In one embodiment, the symbol blocks can be of differing size and shape within the same format for a play of the game. If the format for a play of the game is rectangular in shape, and includes a plurality of square-shaped block positions, the gaming system of one embodiment includes a multi-block position symbol block. For example, in such a square-shaped block position embodiment, the gaming system includes one symbol block that occupies two or more block positions.

It should be appreciated that the symbol blocks can be of various shapes for different plays of the game. In one embodiment, the symbol blocks are square. In another embodiment, the symbol blocks are rectangular. In another embodiment, the blocks are triangular. In another embodiment, the blocks are hexagonal or octagonal. It should be appreciated that the symbol blocks can be selected in any suitable shape. In one embodiment, the shape of the symbol block is affected by the shape of the format or cluster provided at the beginning of the game (i.e., a triangular symbol block is selected in a substantially triangular cluster).

In one embodiment, the symbol blocks are configured to shift relative to the block positions of the format depending upon any empty block positions in the format. In various embodiments, the shifting blocks are configured to shift in the vertical, horizontal, or diagonal direction. For instance, a square or rectangular shaped symbol block shifts vertically or horizontally, depending upon the configuration of the particular embodiment. An octagonal shaped symbol block, however, has the capacity to shift not only horizontally and vertically, but also diagonally due to the shape of the block.

The gaming system of the present disclosure includes various types of symbol blocks. When partial symbols on a plurality of symbol blocks are arranged in a designated spatial relationship to one another, and properly oriented relative to one another, they combine to form a complete symbol. It should be appreciated that in addition to displaying a plurality of partial symbols on a plurality of symbol blocks, other blocks can be added to the set of symbol blocks of the gaming system. In one embodiment, the gaming system randomly selects symbol blocks which display more than one partial symbol on them. In another embodiment, the gaming system randomly selects symbol blocks which display only one or no partial symbols on them. In another embodiment, the gaming system randomly selects bonus symbol blocks, which include one or more partial bonus symbols. In yet another embodiment, the gaming system randomly selects one or more border symbol blocks, which are arranged around the outer periphery of the format.

In one embodiment, each partial symbol has at least one corresponding complementary partial symbol. When the partial symbol and its corresponding complementary partial symbol(s) are arranged within a designated spatial relationship of one another, and properly oriented, they form a complete symbol. In various embodiments, a partial symbol and its complementary partial symbol(s) each comprise part of an image or a picture. For example, in one embodiment, a partial symbol includes one half of the image of a bunch of grapes. In such an embodiment, the corresponding complementary partial symbol includes the other half of the image of the bunch of grapes. It should be appreciated that in various embodiments, more than two partial symbols are used to make a complete symbol (e.g., one partial symbol includes a third of the image of the bunch of grapes, a first complementary partial symbol includes another third of the image of the bunch of grapes, and a second complementary partial symbol includes the final third of the image of the bunch of grapes). It should also be appreciated that any suitable letters, numbers, images, symbols or pictures can be used as complete symbols for the present disclosure.

In one embodiment, the gaming system displays a plurality of symbol blocks which each display more than one partial symbol. It should be appreciated that, in certain embodiments the number of partial symbols displayed on each displayed symbol block depends upon the shape and number of sides of the symbol block.

In one embodiment, the gaming system is configured select symbol blocks which each display only one partial symbol. In one such embodiment, the whole of each symbol block serves as one partial symbol which, when combined with other similar symbol blocks, form a complete symbol which is two blocks or larger. In one embodiment, a complete symbol larger than two symbol blocks is worth a higher value award.

In one embodiment, the gaming system is configured to select symbol blocks which at least in part remain blank. In one such embodiment, the symbol block contains one or more partial symbols, but also contains one or more blank spaces or quadrants. In one embodiment, the gaming system is configured to select wholly blank symbol blocks. It should be appreciated that certain symbol blocks which border the outer periphery of the format may contain blank spaces on the portion(s) of the symbol block which make contact with the outer periphery of the format.

It should be appreciated that the gaming system of one embodiment displays a plurality of different kinds of partial symbols on the symbol blocks in the set of symbol blocks. In one embodiment, the set of symbol blocks include symbol blocks with a plurality of different classes of partial symbols. In another embodiment, the symbol block set includes blocks with bonus symbols.

In one embodiment, the gaming system includes multiple different classes of partial symbols. A complete symbol formed in one such embodiment is worth a higher or lower award than another complete symbol formed, depending upon which class of partial symbols formed the complete symbol. For example, the gaming system of one such embodiment includes a plurality of numerals as a 'special' partial symbol class, and a plurality of simple shapes as a 'common' partial symbol class. The common partial symbol class of the plurality of simple shapes is easier to combine to form a complete symbol, because the two partial symbols can be oriented in any number of ways and still form a complete symbol of a simple shape. The special partial symbol class, however, is harder to combine to form a complete symbol because most numerals can only be oriented in one way to form a complete symbol of a numeral.

In such a multi-class embodiment, the gaming system is configured to provide higher award amounts for the special partial symbol class than the common partial symbol class. It should be appreciated that the gaming system can also be configured to provide fewer partial symbols of a more valuable partial symbol class, regardless of the nature or difficulty of forming a complete symbol from that more valuable partial symbol class. In one embodiment, the gaming system is configured to provide a different class of partial symbols for the border symbol blocks which surround the outer periphery of the format.

In one embodiment, the complete symbols formed by a plurality of partial symbols are part of a larger group of symbols. For example, the complete symbols of one embodiment include each of thirteen different denominations of a deck of playing cards. In another embodiment, the complete symbols include fruit, basic geometric shapes, photographic images, coins, numbers or any other suitable symbol. It should be appreciated that in certain embodiments, the gaming system provides an additional award if a certain combination or threshold of complete symbols are formed within one play of the game. For example, if a player were to form a complete symbol depicting each of the thirteen different denominations of a deck of playing cards in one or more plays of a game, prior to the game ending, the gaming system of one embodiment provides the player with a bonus award.

In one embodiment, the gaming system selects from a set of symbol blocks and displays a plurality of partial bonus symbols on various symbol blocks. In such an embodiment, when a partial bonus symbol and its corresponding complementary partial bonus symbol are combined to form a complete bonus symbol, the gaming system is configured to trigger a bonus event. In one such embodiment, the bonus event includes providing the player with an enhanced award. In another embodiment, the bonus event includes shuffling the symbol blocks in the format. In yet another embodiment, the bonus event includes rotating or re-orienting the selected symbol blocks within the format, thereby providing more opportunities to form complete symbols. In another embodiment, the bonus event causes each symbol block within a certain radius of the complete bonus symbol to be removed, and an award provided for each removed symbol block.

In one embodiment, a partial symbol does not have a corresponding matching partial symbol. In one embodiment, the gaming system has a set of a plurality of predetermined symbol blocks from which to select for displaying in the format. In one such embodiment, the predetermined symbol blocks include a plurality of partial symbols which are provided and arranged so that the gaming system can set the odds of forming a complete symbol in a play of the game. For example, for a complete symbol which is worth a very high award amount, the set of symbol blocks has fewer partial symbols corresponding to the higher-valued complete symbols.

In one embodiment, a symbol block is configured to display the entire complete bonus symbol. In such an embodiment, the symbol block containing the complete bonus symbol need not be oriented within a designated spatial relationship to any other symbol blocks because the complete bonus symbol is self-contained in the symbol block.

In one embodiment, a symbol block is configured to contain only a portion of a partial bonus symbol. For example, the entire symbol block is a partial bonus symbol. In such an embodiment, a plurality of symbol blocks containing only a portion of a partial bonus symbol must be arranged within a designated spatial relationship to one another to form a complete bonus symbol.

In various embodiments, the symbol blocks display more than one partial symbol. In one embodiment, the symbol blocks include as many partial symbols as number of sides it has, depending upon the shape of the symbol block (i.e., a triangular symbol block includes three partial symbols, a square symbol block includes four partial symbols, and a hexagonal symbol block contains six partial symbols). In another embodiment, the symbol block does not have a partial symbol to correspond with each side. In one such embodiment, a square symbol block which has one wall-facing side (i.e., a side of the symbol block which will abut the outer border of the format), only has three partial symbols. In such an embodiment, the wall-facing side of the square symbol block does not include a partial symbol.

Specifically, one such complete matching bonus symbol is the image of a bomb symbol. In one such embodiment, the symbol block set of a gaming system includes a plurality of blocks with partial bonus symbols, which each display the image of one portion of the complete bonus symbol of the bomb symbol. If one partial bonus symbol of the portion of the bomb symbol is arranged within a determined spatial relationship of its complementary partial bonus symbol of the other portion(s) of the bomb symbol, the gaming system causes an explosion bonus event to occur. In one embodiment, when the complete bonus symbol of the bomb symbol is formed, the gaming system causes the bomb symbol to explode. In one embodiment, the gaming system will provide an award to the player for each partial matching bonus block after the bonus event has occurred. In one embodiment, the explosion bonus event will affect a plurality of symbol blocks within a designated radius of the explosion. In one such embodiment, the gaming system provides an award to the player for each affected symbol block within the designated radius of the explosion. After the gaming system has provided the any awards as a result of the explosion bonus event, the affected symbol blocks and the matching bonus blocks are removed, leaving a plurality of empty block positions in the format. The gaming system then repeats the above-described shifting, selection and display of the non-affected and non-partial matching bonus blocks to fill any empty block positions in the format, and the game continues.

In one embodiment, a complete bonus symbol includes a multiplier indicator. In one such embodiment, the multiplier indicator on the complete bonus symbol has the effect of modifying the award value of each complete symbol formed for that play of the game. In another embodiment, the multiplier indicator on the complete bonus symbol has the effect of modifying the amount of the accumulated award amount. It should be appreciated that a complete bonus symbol with a multiplier indicator could modify any suitable award value or playing parameter in the game.

In one embodiment, a bonus symbol block displays one or more partial bonus symbols, at least one of which is configured as a wild partial bonus symbol. In one embodiment, the wild partial bonus symbol serves as the complementary partial symbol to any partial symbol which is within the designated spatial relationship to it. In one embodiment, the orientation of the wild partial bonus symbol is irrelevant. For example, if a square-shaped bonus symbol block contained a wild partial bonus symbol on its right-facing quadrant and the adjacent symbol block to the right of the bonus symbol block includes a partial symbol of a star on its left-facing quadrant, the wild partial bonus symbol functions as the complementary partial symbol of a star and combines with the other partial symbol of the star to form a complete symbol. It should be appreciated that a bonus symbol block can contain more than one wild partial bonus symbol.

In one embodiment, a bonus symbol block displays one or more connecting symbols. In one such embodiment, a connecting symbol on a bonus symbol block serves the function of connecting two or more complete symbols formed in the format which would not otherwise be touching or adjacent to one another. In such an embodiment, the connecting symbol on the bonus symbol block enhances the opportunity and the length of a chain reaction configuration, which increases the amount of award the gaming system provides to the player. Referring now to FIG. 5C for illustrative purposes, suppose symbol block 270 was a bonus symbol block which included a connecting symbol in quadrant 270A. This connecting symbol would join the complete symbol of "A" made up of the partial symbols from symbol blocks occupying block positions 204A and 206A with another complete symbol (i.e., the "10" made up of partial symbols from symbol block 250 and 260). The complete symbol of the number "10" in turn is connected to two other complete symbols in the format. For this illustrative example, a bonus symbol block containing a connecting symbol would increase the player's award significantly by adding to a chain reaction configuration.

In one embodiment, the set of symbol blocks includes a plurality of hidden partial symbols, which are unlocked by a suitable unlocking trigger. In one such embodiment, the unlocking trigger is based upon player performance, wager amount, player status, or bonus features. It should be appreciated that such hidden partial symbols can be unlocked before the symbol blocks are selected and displayed or after the symbol blocks are already displayed in the format. It should also be appreciated that hidden partial symbols can be hidden behind other partial symbols which transform into the hidden partial symbols. For example, in one embodiment a symbol block in the format includes a partial symbol of a queen, and a hidden partial symbol in the symbol block is a partial symbol of a star. When the hidden partial symbol is triggered, the partial symbol of the queen transforms into the hidden partial symbol of the star. In one embodiment, the hidden partial symbols appear in blank quadrants of symbol blocks.

In one embodiment, as illustrated and discussed above in FIGS. 5A to 5I, the gaming system randomly selects a plurality of border symbol blocks from the set of symbol blocks, and displays each selected border symbol block. In one embodiment, the selected border symbol blocks are displayed around the outer periphery of the format of symbol blocks, but are not arranged within the format. In another embodiment, the selected border symbol blocks are included within the format adjacent to the outer periphery. It various embodiments, the selected border symbol blocks do not change position, and do not shift when the symbol blocks within the format shift. In one embodiment, the selected border symbol blocks are not removed when displayed partial border symbols are arranged within a designated spatial relationship with complementary partial symbols to form complete border symbols. In another embodiment, the selected border symbol blocks are not removed when matched to form a complete border symbol.

In one embodiment, the gaming system is configured to provide an additional or enhanced award when all or certain of the border symbol blocks are matched to form complete border symbols. In one such embodiment further discussed below, if over the course of a series of plays of the game prior to the game ending, every one of the border symbol blocks around the format are matched to form complete border symbols, the gaming system provides a progressive award to the player.

In various embodiments, the gaming system is configured to evaluate the format filled with symbol blocks for a play of the game to determine if any complete symbols are formed. In one such embodiment, the gaming system determines whether any partial symbols and complementary partial symbols are arranged within a designated spatial relationship of one another. In one embodiment, the gaming system then determines whether the partial and complementary partial symbols which are arranged within the designated spatial relationship of one another are correctly oriented relative to one another. If the partial and complementary partial symbols meet both of these requirements, a complete symbol is formed.

In one such embodiment, a partial symbol and complementary partial symbol are arranged within a designated spatial relationship of one another when the symbol blocks on which each partial symbol is displayed are arranged adjacent to one another within the format. In another embodiment, the partial and complementary partial symbols are within the designated spatial relationship if the symbol blocks on which they are displayed are arranged in a particular pattern relative to one another. It should be appreciated that in some embodiments, the symbol blocks containing the partial and complementary partial symbols need not be adjacent or in contact with one another to be within the designated spatial relationship. For example, in one such embodiment, if four symbol blocks arranged in each of the four corners of a rectangular format each share a partial and complementary partial symbol, they are within the designated spatial relationship of one another.

As discussed above, it should be appreciated that the partial symbol and complementary partial symbols of various embodiments must be not only arranged within the designated spatial relationship of one another, but also must be oriented correctly relative to one another. In one embodiment, a partial symbol and its complementary partial symbol(s) are arranged within the designated spatial relationship, but do not form a complete symbol if they are not correctly oriented relative to one another. Although two partial symbols may be complementary to one another, and are within the designated spatial relationship to one another, if they are not properly oriented, they do not combine to form a complete symbol.

In one embodiment, the gaming system is configured to identify any semi-complete symbols formed in the format. A semi-complete symbol is formed when at least a specific percentage but not all of the partial symbols of a complete symbol are arranged within the designated spatial relationship and oriented correctly with respect to one another. For example, in one embodiment a complete symbol is made up of four partial symbols. If the gaming system determines that three of the partial symbols are correctly oriented within the designated spatial relationship, a semi-complete symbol is formed. In one embodiment, the gaming system provides an award for each semi-complete symbol formed.

In various embodiments, after evaluating the arrangement of various symbol blocks and partial symbols for any complete symbols, the gaming system identifies all complete symbols formed. In one embodiment, the gaming system outlines or highlights the complete matching symbol within the format. In one embodiment, the gaming system uses any other suitable notification method to inform the player that one or more complete symbols have been formed and identified. It should be appreciated that the gaming system can be configured to use both audio or visual indicators.

In one embodiment, the gaming system is configured to outline or highlight not only the complete symbol, but also the perimeter of each matching block in the format. For example, in one such embodiment, the gaming system identifies a chain reaction of three complete symbols in the format and outlines the matching block including any part of the partial symbols which make up one of those three complete symbols.

In various embodiments, the gaming system causes each complete symbol to be removed from the format following its identification as a complete symbol. In one embodiment, as discussed above and illustrated in FIGS. 5A to 5I, the gaming system is configured to remove each matching block which contains at least one partial symbol used to form a complete symbol.

In one embodiment, the gaming system employs various visual effects when it removes each matching block from the format. For example, in one such embodiment, the gaming system causes each matching block to explode. In another embodiment, the gaming system causes each matching block to fade away. In another embodiment, the gaming system causes each matching block to be squeezed or shrunk under the "pressure" of the blocks above it. It should be appreciated that, in such a squeezing or shrinking embodiment, the gaming system contemporaneously removes the matching blocks and shifts the selected and displayed blocks (further discussed below). It should be appreciated that the gaming system is configured to employ a plurality of different suitable methods or procedures for removing each complete symbol and matching block.

In various embodiments, the gaming system is configured to provide an award to the player for each complete symbol formed in the gaming system. In one embodiment, the gaming system provides a static award amount for every complete symbol formed, regardless of the nature or location of the symbol. In another embodiment, the gaming system is configured to dynamically adjust the award amounts for different complete symbols formed.

In one embodiment, the gaming system adjusts the award amount based upon which row or which column the complete symbol falls in. In another embodiment, the gaming system adjusts the award amount based upon which class of partial symbols make up the complete symbols formed. For example, as discussed above, a complete symbol formed from a "special class" of partial symbols is worth more of an award than a complete symbol formed from a "common class" of partial symbols. In one embodiment, the gaming system adjusts the award amount based upon whether the complete symbol includes a partial bonus symbol. In one embodiment, the gaming system adjusts the award amount based upon whether the complete symbol includes a partial border symbol. In one embodiment discussed briefly above, the gaming system adjusts the award amount based upon how many complete symbols are chained together in contact with one another, making a chain reaction bonus event. It should be appreciated that the gaming system can be configured to provide awards or bonus awards for any suitable configuration of symbol blocks or event in the plays of the game. In one embodiment, the gaming system is configured to adjust the award amount of each complete symbol based upon the odds of forming that complete symbol.

As discussed above, the gaming system of one embodiment is configured to identify a semi-complete symbol. In one such embodiment, the gaming system provides an award or a partial award to the player for each semi-complete symbol. In one embodiment, the gaming system provides the full award for a semi-complete symbol equal to the award provided for a complete symbol. In another embodiment, the gaming system provides a partial symbol for each semi-complete symbol, which is related to the percentage or number of partial symbols assembled within the designated spatial relationship and in a proper orientation to one another. For example, if the gaming system included three partial symbols which made up three-fourths of a complete symbol, the gaming system of one embodiment provides the player three quarters of the award amount provided for a complete symbol.

In one embodiment, the gaming system is configured to provide an award for each bonus symbol or bonus event for a play of the game. In one such embodiment, the gaming system provides an enhanced award amount for each bonus symbol formed. In one embodiment previously discussed, the bonus symbol is a block representing a bomb symbol. In one such embodiment, when the bomb symbol explodes or is detonated, it affects a plurality of other symbol blocks within a designated radius. Each affected symbol block, as well as the bomb symbol block which was detonated, are removed by the gaming system, and an award amount is provided for each removed block. In one embodiment, the radius of the bomb symbol explosion event serves as a connecting symbol(s) to connect other complete symbols or partial chain reaction chains to one another, thereby creating a larger chain reaction event, as discussed above. In one such embodiment, the gaming system provides enhanced award amounts for each block removed as a result of the bomb symbol explosion and the chain reaction.

In various embodiments, the gaming system is configured to provide at least one progressive award opportunity to the player. In one embodiment, the gaming system contributes a certain percentage of each wager on the game to progressive award pools. In one such embodiment, the gaming system provides a progressive award if each of the plurality of partial border symbols on the border symbol blocks are matched to form complete border symbols. In one embodiment, the gaming system provides a provides a progressive award if each of a plurality of a set of a complete symbols are formed within one series of plays of the game. For example, if the player accumulates a complete symbol for each of the thirteen different values of playing card denominations in a typical 52-card deck prior to the game ending, the gaming system provides a progressive award to the player. It should be appreciated that the gaming system of one embodiment is configured to provide a progressive award for any suitable event or series of events for a play or plays of the game.

In one embodiment, the gaming system is configured to increase the award amount for each complete symbol formed as the game proceeds to later plays. For example, the gaming system of one such embodiment provides ten credits for each of a certain complete symbol formed in the first play of the game, twelve credits for each of the same type of complete symbol formed in the second play of the game, and so on, increasing for each subsequent play. It should be appreciated that the marginal award amount increase from one play to the next continues across each different level of award provided, from a large award associated with a bonus event to a smaller award associated with a “common class” complete symbol.

In one embodiment, the gaming system removes each of the matching blocks after providing the player with an award or awards for the complete symbol(s). In one embodiment, the gaming system is also configured to remove each bonus matching symbol block from the format. In one embodiment the gaming system is configured to remove each matching border symbol from the format as well. The removal of each matching block results in an empty block position in the format. In one embodiment, after each matching block is removed, whether it be a bonus symbol block or border symbol block, the gaming system shifts one or more non-matching symbol blocks into the one or more recently empty block positions in the format.

In one embodiment, the shifting of one or more selected non-matching symbol blocks into one or more empty block positions results in one or more additional empty block positions. In one such embodiment, the gaming system continues to shift any selected non-matching symbol blocks into the additional empty block positions until any empty block positions are in a designated location of the format.

In one embodiment, the gaming system is configured to shift the symbol blocks in any one of a plurality of different directions. In one such embodiment, the format is rectangular in shape, and the gaming system is configured to shift the symbol blocks from the top of the format down. In another embodiment, the gaming system is configured to shift the symbol blocks from the left side of the format to the right side of the format or from the right to the left. In yet another embodiment, the gaming system is configured to shift according to ‘anti-gravity,’ which pushes symbol blocks from the bottom of the screen toward the empty block positions at the top of the screen. It should be appreciated that certain embodiments include more than one different method of shifting the symbol blocks within the same game. For example, one such embodiment shifts blocks from the left side of the format to the right side of the format after one play of the game, and then from the top of the format toward the bottom of the format in another play of the same game. It should be appreciated that the direction of the shifting and the designated location of the format to which selected blocks are shifted is different in various embodiments. In one embodiment, the user can select the direction of the shifting of symbol blocks at the beginning of a play of the game.

In another embodiment, the gaming system is configured to shift the symbol blocks diagonally. In such an embodiment, the gaming system requires symbol blocks which are shaped with at least two sets of parallel sides that are angled at forty five degrees from the horizontal. For example, a symbol block of one such embodiment takes the shape of an octagon. It should be appreciated that, by selecting symbol blocks with parallel forty five degree sides, the gaming system enables those symbol blocks to shift along the forty five degree sides in a diagonal fashion. It should be appreciated that the gaming device is configured to shift symbol blocks in any suitable direction depending upon the size and shape of the format and the size and shape of each symbol block being selected.

In various embodiments, once all empty block positions are in the designated location of the format, the system selects and displays a new symbol block to occupy each of the designated empty block positions. Such a selection and display provides an opportunity to display additional partial symbols for the play of the game.

In one embodiment, the gaming system is configured to select the new symbol blocks on one of the sides of the format, depending upon which direction the selected symbol blocks have shifted following the previous play of the game. For example, in one embodiment, in which the selected symbol blocks are shifted downward in a rectangular format, the gaming system selects new symbol blocks to be displayed at the top of the format. In such an embodiment, due to the removal and shifting of the matching blocks and selected symbol blocks following the previous play of the game, the new symbol blocks have at least one empty block position in which to shift. In one embodiment, the gaming device shifts the newly selected and displayed symbol blocks into the furthest empty block position in the format.

In various embodiments which include a plurality of empty block positions in the same row or column, the gaming device is configured to select additional new symbol blocks from the set of symbol blocks to display in the additional empty block positions. The gaming system repeats this selection, display and shifting until there are no longer any empty block positions remaining in the format.

It should be appreciated that the gaming system of one embodiment generates three-dimensional symbol blocks for the play of the game. In one such embodiment, the gaming system selects and displays cubical symbol blocks which have six faces. On each face, the three-dimensional symbol block displays at least one partial symbol. In one such embodiment, the gaming system is configured to rotate the three-dimensional symbol block as it is displayed or shifted into empty block positions. Rotating the three-dimensional symbol block briefly reveals to the player the different partial symbol configurations displayed on more than one of the six sides which may or may not be displayed after the three-dimensional symbol block has reached its resting place in an empty block position.

In one embodiment, the gaming system causes each three-dimensional symbol block to rotate or spin prior to shifting into a destination empty block position. In another embodiment, the gaming system causes each three-dimensional symbol block to rotate or spin after having shifted into the destination empty block position. In yet another embodiment, the gaming system causes each three-dimensional symbol block to rotate or spin while it shifts to the empty block position in the format. It should be appreciated that the gaming system can be configured to spin a three-dimensional symbol block along any suitable horizontal, vertical, diagonal or random axis.

In one embodiment, the gaming system includes an additional feature in which three-dimensional symbol blocks can be further manipulated or rotated at some time other than immediately prior to, during or after a shift. In another embodiment, the gaming system manipulates all other symbol blocks after having been arranged within the format. For example, in one such embodiment, the gaming system will swap two symbol blocks or rotate a series of symbol blocks within the format to shuffle up the configuration of partial symbols. In another embodiment, the gaming system causes symbol blocks to shift from one side of the format around to the opposite side. For example, referring to FIG. 5A for illustrative purposes, a symbol block of a shifting embodiment occupies block position 206E and shifts to the right "wrapping around" the format to block position 206A. Subsequently, in one such embodiment, each of the symbols in 206A, 206B, 206C and 206D will also shift one block position to the right. In another such embodiment, the gaming system will cause the block occupying 206E to shift and replace the block occupying 206A, thereby creating an empty block position in 206E. It should be appreciated that, in the case of further manipulating symbol blocks or three-dimensional symbol blocks, the format need not have empty block positions. It should also be appreciated that in certain embodiments, further manipulation of symbol blocks results in one or more additional empty block positions that would not otherwise be empty but for the manipulation. In one embodiment, manipulating symbol blocks within the format is a bonus feature which the player can at least in part control.

In another embodiment, the gaming system is configured to include a rotation feature, which rotates a symbol block in an either clockwise or counterclockwise direction within its original block position. For example, in FIG. 5F, block position 204E, the current configuration of the symbol block has the upper portion of a nine situated upside down on the top quadrant, the lower portion of a three situated sideways on the right quadrant, the lower portion of a queen situated upside down on the bottom quadrant, and the right portion of an eight situated normally in the left quadrant. If the symbol block occupying block position 204E were rotated ninety degrees clockwise, the portion of the three would be in the bottom quadrant, the portion of the queen would be in the left quadrant, the portion of the eight would be in the top quadrant, and the portion of the nine would be in the right quadrant. It should be appreciated that this rotation feature can occur for evaluation purposes before or after all of the symbol blocks have been shifted into the format.

It should be appreciated that this rotation feature as well as the wrap around feature discussed above and other symbol block manipulation features disclosed herein, can be activated in a variety of different ways. In one embodiment, the features are purchased individually by the player. In another embodiment, the player wins the features based upon a predetermined threshold of credits in the game. In another embodiment, the player earns the features based upon special status determined by a suitable player tracking system. It should be appreciated that such features can be accumulated and selectively useable by either the player or the gaming system. For example, if the player has earned three symbol block rotations, the gaming system displays that accumulated number of features to the player.

In one embodiment, the player can choose when to use the features. In another embodiment, the gaming system uses the accumulated, earned, or purchased features at random. In one embodiment, the player determines which symbol blocks or what part of the format will be affected by the feature to be used. In another embodiment, the gaming device determines the location of the use of the features. In one embodiment, the player determines which direction the symbol block will rotate or wrap around, depending upon the feature being used. In another embodiment, the gaming system determines the direction of symbol block manipulation. It should be appreciated that the player can have complete control over each aspect of selecting when, where and how to use the features, the gaming system can have complete control over each aspect of selecting when, where and how to use the features, or a combination of inputs by the player and random determinations of the gaming system determine when, where and how to use the features.

It should be appreciated that, after shifting, selecting new symbol blocks from the set of symbol blocks, and displaying the new symbol blocks, the gaming system repeats the above-described processes and: (1) determines whether the newly selected and displayed symbol blocks in the plurality of block positions include any partial symbols which are displayed in the designated spatial relationship with any complementary partial symbols; (2) identifies any complete symbols formed by those partial and complementary partial symbols; (3) provides an award for each matching symbol and/or complete symbol formed in the format, as well as any other bonus award or event; (4) removes each of the matching symbols from the format creating a plurality of empty block positions; (5) shifts any generated symbol blocks into the empty block positions until all empty block positions in the format are in a designated area of the format; and (6) select new symbol blocks from the set of symbol blocks to be displayed in each of the empty block positions in the format. If such spatially related partial symbols and complementary symbols are displayed, and a corresponding complete symbol is generated, the gaming system repeats the above-process until no complete symbols or matching blocks are displayed. When no complete symbols or matching blocks are displayed, the game is over.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one input device;

at least one display device;

at least one processor; and at least one memory device which stores a plurality of instructions, which when executed by the at least one processor, causes the at least one processor to operate with the at least one input device and the at least one display device, for a play of a game, to:

(a) randomly select a plurality of symbol blocks from a set of symbol blocks, each of a plurality of symbol blocks of the set of symbol blocks includes a plurality of partial symbols, each of said partial symbols having at least one corresponding complementary partial symbol on another symbol block in the set of symbol blocks;

(b) display the plurality of randomly selected symbol blocks;

(c) determine if any complete symbols are formed by the displayed symbol blocks, each complete symbol requiring:

(1) a first partial symbol displayed on a first displayed symbol block; and (2) for said first partial symbol, a corresponding complementary partial symbol displayed on a second displayed symbol block, said second displayed symbol block being adjacent to and arranged within a designated spatial relationship with said first displayed symbol block;

(d) for each of a designated number of formed complete symbols, provide an award to the player;

(e) remove a plurality of the displayed symbol blocks, each removed symbol block creating at least one empty symbol block position; and (f) for at least one of the created empty symbol block positions, shift a one of said remaining displayed symbol blocks into said created empty symbol block positions.

2. The gaming system of claim 1, wherein each of the plurality of removed symbol blocks display either: (a) one of said partial symbols of at least one formed complete symbol, or (b) at least one of said included corresponding complementary partial symbol of at least one formed complete symbols.

3. The gaming system of claim 2, wherein when executed by the at least one processor for the play of the game, the plurality of instructions cause the at least one processor to create a new empty symbol block position after shifting at least one of the remaining displayed symbol blocks.

4. The gaming system of claim 1, wherein said complete symbol requires the first partial symbol to be arranged in a predetermined orientation with the corresponding complementary partial symbol.

5. The gaming system of claim 1, wherein when executed by the at least one processor for the play of the game, the plurality of instructions cause the at least one processor to generate the plurality of symbol blocks in the shape of at least one selected from the group consisting of: a square, a rectangle, a triangle, a trapezoid, a pentagon, a hexagon, a rhombus, and an octagon.

6. The gaming system of claim 5, wherein the plurality of symbol blocks each contains at least one of said partial symbols for each side of the symbol block.

7. The gaming system of claim 1, wherein when executed by the at least one processor for the play of the game, the plurality of instructions cause the at least one processor to display the plurality of randomly selected symbol blocks in a designated format of an M by N rectangular matrix with M columns and N rows.

8. The gaming system of claim 1, wherein said partial symbol is arranged within said designated spatial relationship with said at least one corresponding complementary partial symbol if said partial symbol is oriented with said corresponding complementary partial symbol.

9. The gaming system of claim 1, wherein said plurality of symbol blocks include a plurality of center symbol blocks, a plurality of border symbol blocks, and a plurality of bonus symbol blocks.

10. The gaming system of claim 1, wherein the set of symbol blocks includes center symbol blocks, border symbol blocks, and bonus symbol blocks.

11. A gaming system comprising:

at least one input device;

at least one display device;

at least one processor; and at least one memory device which stores a plurality of instructions, which when executed by the at least one processor, causes the at least one processor to operate with the at least one input device and the at least one display device, for a play of a game, to:

(a) randomly select a plurality of symbol blocks, each symbol block containing a plurality of partial symbols, wherein each of said partial symbols has at least one corresponding complementary partial symbol;

(b) display each of the plurality of randomly selected symbol blocks in a different one of a plurality of empty symbol block position; and (c) for each displayed partial symbol, if said partial symbol is displayed adjacent to and within a designated spatial relationship with that partial symbol's corresponding complementary partial symbol to form a complete symbol:

(i) provide an award to a player for said formed complete symbol;

(ii) for each symbol block that has at least one partial symbol which forms said complete symbol, remove said symbol block, each removed symbol block creating a new empty symbol block position; and (iii) shift a different one of said selected symbol blocks into each of the created empty symbol block positions.

12. The gaming system of claim 11, wherein when executed by the at least one processor for the play of the game, the plurality of instructions cause the at least one processor to display a new symbol block from the plurality of symbol blocks in at least one of the empty symbol block positions.

13. The gaming system of claim 12, wherein when executed by the at least one processor for the play of the game, the plurality of instructions cause the at least one processor to display said new symbol block after said different one of said selected symbol blocks has been shifted into each of the created empty symbol block positions.

14. The gaming system of claim 11, wherein when executed by the at least one processor for the play of the game, the plurality of instructions cause the at least one processor to randomly select the new symbol blocks and the plurality of selected symbol blocks from one set of symbol blocks.

15. The gaming system of claim 14, wherein when executed by the at least one processor for the play of the game, the plurality of instructions cause the at least one processor to provide the player is provided with an additional award when a plurality of complete symbols are arranged adjacent to one another.

16. The gaming system of claim 14, wherein when executed by the at least one processor for the play of the game, the plurality of instructions cause the at least one processor to enables the player to selectively manipulate said randomly selected and displayed symbol blocks.

17. The gaming system of claim 14, wherein when executed by the at least one processor for the play of the game, the plurality of instructions cause the at least one processor to enables the player to selectively manipulate the partial symbols contained on said symbol blocks.

18. The gaming system of claim 14, wherein when executed by the at least one processor for the play of the game, the plurality of instructions cause the at least one processor to form a partial complete symbol when one of said partial symbols is arranged within said designated spatial relationship with at least one but not all of its corresponding complementary partial symbols.

19. The gaming system of claim 18, wherein when executed by the at least one processor for the play of the game, said plurality of instructions cause the at least one processor to provide a partial award to the player for each partial complete symbol formed.

20. A gaming system comprising:

at least one input device;

at least one display device;

at least one processor; and at least one memory device which stores a plurality of instructions, which when executed by the at least one processor, causes the at least one processor to operate with the at least one input device and the at least one display device, for a play of a game, to:

(a) maintain a set of a plurality of partial symbols, wherein each of the plurality of partial symbols has at least one corresponding complementary partial symbol;

(b) display a format of block positions;

(c) randomly select and display one of the plurality of symbol blocks from a set of symbol blocks in each of the block positions of the format;

(d) for each partial symbol which is displayed in a designated spatial relationship with that partial symbol's corresponding complementary partial symbol, determine whether said partial symbol and said corresponding complementary partial symbol are oriented relative to one another, wherein said oriented partial symbol and corresponding complementary partial symbol within said designated spatial relationship to one another forms a complete symbol; and (e) for each formed complete symbol:

provide an award to a player of the game, (ii) remove each symbol block having one of the partial symbols of the complete symbols formed to create an empty symbol block position in the format, and (iii) display in each of said created empty symbol block positions, a different one of:

(1) said remaining selected and displayed symbol blocks, and (2) a newly randomly selected symbol block from the set of symbol blocks.

21. The gaming system of claim 20, wherein when executed by the at least one processor for the play of the game, the plurality of instructions cause the at least one processor to repeat steps (a) to (d) until no complete symbols are formed.

22. The gaming system of claim 20, wherein the complete symbols include at least one from the group consisting of: shapes; playing card symbols; numbers; letters; and images.

* * * * *

UNITED STATES PATENT AND TRADEMARK OFFICE

CERTIFICATE OF CORRECTION

PATENT NO. : 8,287,357 B2
APPLICATION NO. : 12/576023
DATED : October 16, 2012
INVENTOR(S) : Kyle H. Evans It is certified that error appears in the above-identified patent and that said Letters Patent is hereby corrected as shown below:

IN THE CLAIMS
In Claim 1, Column 36, Line 67, replace “causes” with --cause--.
In Claim 1, Column 37, Line 4, between “of” and “symbol” insert --the--.
In Claim 1, Column 37, Line 5, replace “includes” with --including--.
In Claim 1, Column 37, Line 24, replace “the” with --a--.
In Claim 1, Column 37, Line 29, delete “a”.
In Claim 1, Column 37, Line 30, between “said” and “created” insert --at least one--.
In Claim 1, Column 37, Line 31, replace “positions” with --position--.
In Claim 2, Column 37, Line 33, replace “display” with --displays--.
In Claim 2, Column 37, Line 36, replace “symbol” with --symbols--.
In Claim 2, Column 37, Lines 36 to 37, replace “symbols” with --symbol--.
In Claim 6, Column 37, Line 54, between “wherein” and “the” insert --each of--.
In Claim 6, Column 37, Line 55, delete “each”.
In Claim 8, Column 37, Line 63, between “said” and “partial” insert --first--.
In Claim 8, Column 37, Line 65, delete “at least one”.
In Claim 8, Column 37, Line 66, between “said” and “partial” insert --first--.
In Claim 11, Column 38, Line 14, replace “causes” with --cause--.
In Claim 11, Column 38, Line 23, replace “position” with --positions--.
In Claim 11, Column 38, Line 34, replace “a new” with --an--.
In Claim 14, Column 38, Line 50, replace “11” with --12--.
In Claim 15, Column 38, Line 58, delete “is provided”.
In Claim 16, Column 38, Line 64, replace “enables” with --enable--.
In Claim 17, Column 39, Line 2, replace “enables” with --enable--.
In Claim 20, Column 39, Line 21, replace “causes” with --cause--.
In Claim 20, Column 39, Line 29, replace “the plurality” with --a plurality--.
In Claim 20, Column 40, Line 9, replace “forms” with --form--.
In Claim 20, Column 40, Line 12, replace “(ii)” with --(i)--.
In Claim 20, Column 40, Line 13, replace “symbols” with --symbol--.
In Claim 20, Column 40, Line 16, replace “(iii)” with --(ii)--.

Signed and Sealed this
Twenty-ninth Day of January, 2013

David J. Kappos

David J. Kappos
*Director of the United States Patent and Trademark Office*